United States Patent
Ishihara et al.

(10) Patent No.: US 8,990,521 B2
(45) Date of Patent: Mar. 24, 2015

(54) INFORMATION PROCESSING DEVICE AND COMPUTER PROGRAM PRODUCT

(75) Inventors: Takeshi Ishihara, Kanagawa (JP); Yoshimichi Tanizawa, Kanagawa (JP); Kotaro Ise, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 207 days.

(21) Appl. No.: 13/609,920

(22) Filed: Sep. 11, 2012

(65) Prior Publication Data

US 2013/0138900 A1    May 30, 2013

(30) Foreign Application Priority Data

Nov. 24, 2011  (JP) ................................. 2011-256133

(51) Int. Cl.
G06F 12/06 (2006.01)
G06F 3/06 (2006.01)

(52) U.S. Cl.
CPC ............ G06F 3/0625 (2013.01); G06F 3/0685 (2013.01)
USPC ................... 711/158; 711/E12.001; 713/324; 713/340

(58) Field of Classification Search
CPC .... G06F 3/0625; G06F 3/0685; G06F 3/0683
USPC .......... 711/158, 163, 170, E12.001; 713/324, 713/340
See application file for complete search history.

(56) References Cited

U.S. PATENT DOCUMENTS

| | | | | |
|---|---|---|---|---|
| 5,903,914 | A * | 5/1999 | Zulian | 711/163 |
| 8,078,794 | B2 * | 12/2011 | Lee et al. | 711/103 |
| 8,230,186 | B2 * | 7/2012 | Toda | 711/162 |
| 8,738,866 | B2 * | 5/2014 | Sonoda et al. | 711/154 |
| 2007/0220198 | A1 | 9/2007 | Kassai | |
| 2008/0244164 | A1 * | 10/2008 | Chang et al. | 711/103 |
| 2009/0043831 | A1 * | 2/2009 | Antonopoulos et al. | 711/103 |
| 2009/0135700 | A1 * | 5/2009 | Fujibayashi | 369/85 |
| 2011/0145486 | A1 | 6/2011 | Owa et al. | |

FOREIGN PATENT DOCUMENTS

| | | |
|---|---|---|
| JP | 2002-026803 | 1/2002 |
| JP | 2005-031828 | 2/2005 |
| JP | 2005-057587 | 3/2005 |
| JP | 2007-249784 | 9/2007 |
| JP | 2010-044460 | 2/2010 |
| JP | 2011-128792 | 6/2011 |

OTHER PUBLICATIONS

Japanese Office Action for Japanese Patent Application No. 2011-256133 mailed on Nov. 18, 2014.

* cited by examiner

*Primary Examiner* — Pierre-Michel Bataille
(74) *Attorney, Agent, or Firm* — Amin, Turocy & Watson, LLP

(57) ABSTRACT

According to an embodiment, an information processing device that includes a first storage unit and a second storage unit having power consumption different from that of the first storage unit. The information processing device also includes a control unit configured to make a control to determine a priority of information that is to be stored in the first storage unit or the second storage unit. The control unit is configured to store the information into the first storage unit or into the second storage unit based on the determined priority.

10 Claims, 16 Drawing Sheets

INFORMATION PROCESSING DEVICE AND COMPUTER PROGRAM PRODUCT

CROSS-REFERENCE TO RELATED APPLICATION

This application is based on and claims the benefit of priority from Japanese Patent Application No. 2011-256133, filed on Nov. 24, 2011; the entire contents of which are incorporated herein by reference.

FIELD

Embodiments described herein generally relate to an information processing device and a computer program product.

BACKGROUND

Attempts to reduce power consumption of devices have been made. For example, a storage unit that has been conventionally configured by a volatile memory is configured by a non-volatile memory and a power supply to the storage unit is controlled. Specifically, the power supply to the storage unit is stopped when a central processing unit (CPU) is in a power-saving mode. When the CPU enters a normal-power mode, the power supply to the storage unit is started. With this configuration, energy consumption is reduced, compared to the case in which the volatile memory is used for the storage unit.

However, in a system of using only one type of memory as the storage unit, a performance of the entire device might be deteriorated due to deteriorated performance of the used memory.

DETAILED DESCRIPTION

According to an embodiment, an information processing device that includes a first storage unit and a second storage unit having power consumption different from that of the first storage unit. The information processing device also includes a control unit configured to make a control to determine a priority of information that is to be stored in the first storage unit or the second storage unit. The control unit is configured to store the information into the first storage unit or into the second storage unit based on the determined priority.

Exemplary embodiments of an information processing device will be described.

First Embodiment

Figure 1:
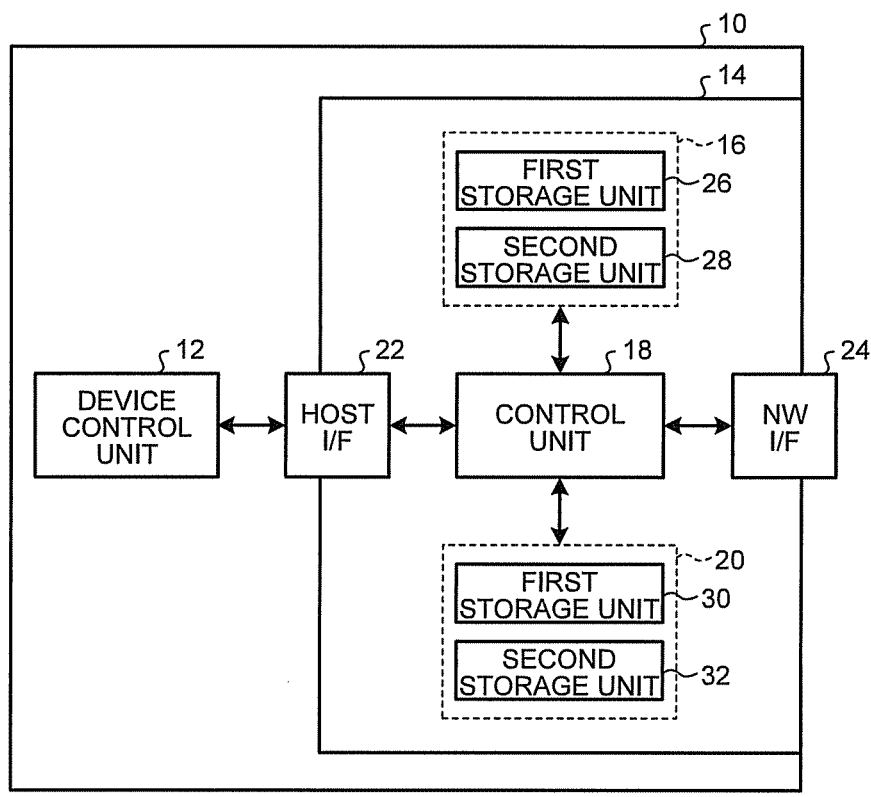
FIG. 1 is a diagram illustrating an information processing device according to a first embodiment.

FIG. 1 is a block diagram illustrating a functional configuration of an information processing device 10 according to a first embodiment. The information processing device 10 includes a device control unit 12, and an interface unit 14 (hereinafter referred to as an I/F unit 14).

The device control unit 12 controls the whole information processing device 10. Specifically, the device control unit 12 transmits information, which is to be transmitted to an external device, to the I/F unit 14. The device control unit 12 also receives information from the external device via the I/F unit 14.

The I/F unit 14 connects the device control unit 12 to network. Specifically, the I/F unit 14 transmits the information accepted from the device control unit 12 to the external device via the network. The I/F unit 14 also transmits the information accepted from the external device via the network to the device control unit 12. The network is a communication network such as the Internet.

The first embodiment will be described below, supposing that the I/F unit 14 accepts a packet from the device control unit 12 as information, and transmits the same to the external device. Similarly, the first embodiment will be described below, supposing that the I/F unit 14 accepts a packet from the external device as information, and transmits the same to the device control unit 12.

The I/F unit 14 includes a host interface 22 (hereinafter referred to as a host I/F 22), a network interface 24 (hereinafter referred to as an NW I/F 24), a control unit 18, a storage unit 16, and a storage unit 20.

The host I/F 22 connects the I/F unit 14 to the device control unit 12. Specifically, the host I/F 22 accepts a packet from the device control unit 12, and transmits the same to the control unit 18. The host I/F 22 accepts the packet from the control unit 18, and transmits the same to the device control unit 12.

The host I/F 22 may be realized by using a system of a known external I/O connection. When the whole information processing device 10 may be configured by a large scale integration (LSI), and the device control unit 12, the control unit 18, the storage unit 16, and the storage unit 20 are configured as elements on the LSI, the host I/F 22 may be configured by an internal bus.

The NW I/F 24 connects the I/F unit 14 to the network. Specifically, the NW I/F 24 transmits the packet accepted from the control unit 18 to the external device via the network. The NW I/F 24 also transmits the packet accepted from the external device via the network to the control unit 18.

The NW I/F 24 is specified as an interface that can be connected to a wired network such as 1000 BASE-T, or wireless network such as IEEE 802.11n. The communication system of the NW I/F 24 may be not only the network for a local area network (LAN) but also the communication system for a wide area network (WAN) such as Long Term Evolution (LTE) or Worldwide Interoperability for Microwave Access (WiMAX) or the personal area communication system such as Bluetooth (registered trademark).

The storage unit 16 temporarily stores the packet received from the device control unit 12. The storage unit 20 temporarily stores the information received from the external device via the network. Specifically, each of the storage unit 16 and the storage unit 20 functions as a buffer for transmitting and receiving information at the I/F unit 14.

The control unit 18 is a computer configured by including a CPU, a read only memory (ROM), and a random access memory (RAM), and controls the whole I/F unit 14. Specifically, the control unit 18 controls to store the packet to a first storage unit 26, a second storage unit 28, a first storage unit 30, and a second storage unit 32.

Next, the storage unit 16, the storage unit 20, and the control unit 18 will be described in detail.

Figure 2:
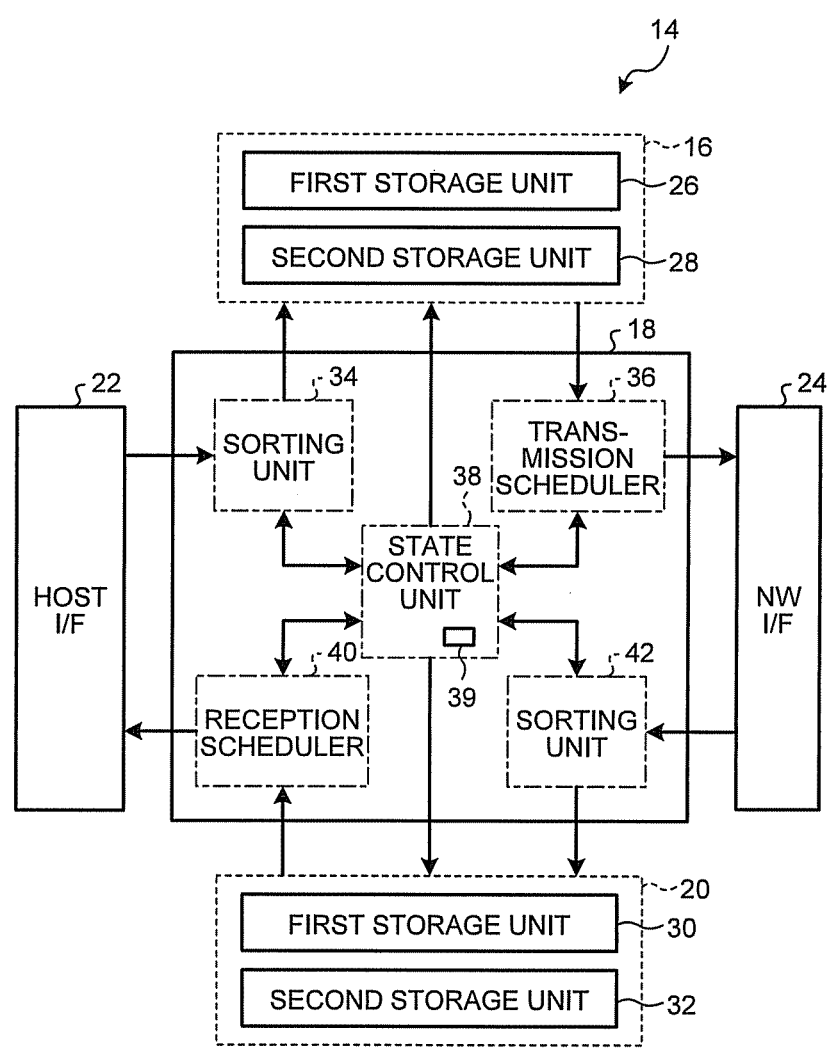
FIG. 2 is a diagram of an I/F unit according to the first embodiment.

FIG. 2 is a block diagram illustrating in detail a functional configuration of the I/F unit 14.

As illustrated in FIG. 2, each of the storage unit 16 and the storage unit 20 includes plural storage units, each having different power consumption. For example, in the first embodiment, each of the storage unit 16 and the storage unit 20 includes two types of the storage units, each having different power consumption. The number of the types of the storage units, each of which forms the storage unit 16 and the storage unit 20 respectively, and has different power consumption, is not limited to two, but is only necessary two or more.

Specifically, as illustrated in FIG. 2, the storage unit 16 includes the first storage unit 26 and the second storage unit 28 in the first embodiment. The first storage unit 26 and the second storage unit 28 have different power consumption. Similarly, the storage unit 20 includes the first storage unit 30 and the second storage unit 32. The first storage unit 30 and the second storage unit 32 have different power consumption.

The "power consumption" described above means a total amount of electric energy used by the respective storage units (the first storage unit 26, the second storage unit 28, the first storage unit 30, and the second storage unit 32). Specifically, it means an amount of electric energy used by the respective storage units (the first storage unit 26, the second storage unit 28, the first storage unit 30, and the second storage unit 32) in a state in which the respective storage units do not include a state change (described later).

In the first embodiment, the state of each of the storage units (the first storage unit 26, the second storage unit 28, the first storage unit 30, and the second storage unit 32) is independently changed by the later-described control of the control unit 18. The state is determined by at least one of the function, performance, and power consumption of each of the storage units (the first storage unit 26, the second storage unit 28, the first storage unit 30, and the second storage unit 32). In the first embodiment, it is supposed in the description below that each of the storage units (the first storage unit 26, the second storage unit 28, the first storage unit 30, and the second storage unit 32) is controlled to be in two types of states, which are an active state and an inactive state.

The types of the states that each of the storage units (the first storage unit 26, the second storage unit 28, the first storage unit 30, and the second storage unit 32) can assume is not limited to two.

The active state indicates that each of the storage units (the first storage unit 26, the second storage unit 28, the first storage unit 30, and the second storage unit 32) is readable and writable. The inactive state indicates that each of the storage units (the first storage unit 26, the second storage unit 28, the first storage unit 30, and the second storage unit 32) is unwritable and unreadable. The power consumption in the active state is larger than the power consumption in the inactive state.

The control unit 18 controls the state of each of the storage units (the first storage unit 26, the second storage unit 28, the first storage unit 30, and the second storage unit 32). The control unit 18 controls the electric energy supplied to each of the storage units (the first storage unit 26, the second storage unit 28, the first storage unit 30, and the second storage unit 32) or the frequency of the synchronization signal, thereby controlling the state of each of the storage units (the first storage unit 26, the second storage unit 28, the first storage unit 30, and the second storage unit 32).

In the first embodiment, the control unit 18 performs a control to allow the first storage unit 26 and the second storage unit 28 in the storage unit 16 to store packets having different priority. Similarly, the control unit 18 performs a control to allow the first storage unit 30 and the second storage unit 32 in the storage unit 20 to store packets having different priority.

Specifically, in the first embodiment, the control unit 18 performs the control to allow the first storage unit 26 and the first storage unit 30 to store a packet having a high priority, such as a first priority set beforehand or higher. The control unit 18 also performs the control to allow the second storage unit 28 and the second storage unit 32 to store a packet having a low priority, such as a priority lower than the first priority. The priority of the packet to be stored is determined by the control unit 18 (the detail will be described later). The first priority is a threshold value used for sorting packets, which are to be stored, by the control unit 18 as described later. The first priority is set beforehand by the control unit 18.

Specifically, each of the storage unit 16 and the storage unit 20 includes plural types of storage units, each corresponding to the priority of the packet to be stored.

When the first storage unit 26 and the first storage unit 30 are used as the storage units storing a packet having a high priority that is the first priority or higher, and the second storage unit 28 and the second storage unit 32 are used as the storage units storing a packet having a low priority that is a priority lower than the first priority, the power consumption of each of these storage units desirably satisfies the relationship described below.

In this case, it is preferable that the power consumption of the second storage unit 28 and the second storage unit 32 in a non-access state be less than the power consumption of the first storage unit 26 and the first storage unit 30 in the non-access state. In this case, it is also preferable that the first storage unit 26 and the first storage unit 30 can be accessed at a higher speed, compared to the second storage unit 28 and the second storage unit 32.

The power consumption in the non-access state means electric energy needed to hold the information stored in the respective storage units in a state in which there is no access (reading and writing of information) to the respective storage units (the first storage unit 26, the second storage unit 28, the first storage unit 30, and the second storage unit 32) from the respective units electrically connected to each of the storage units (the first storage unit 26, the second storage unit 28, the first storage unit 30, and the second storage unit 32).

A known storage unit satisfying the above-mentioned condition can be used for the respective storage units (the first storage unit 26, the second storage unit 28, the first storage unit 30, and the second storage unit 32).

For example, a double data rate (DDR) synchronous dynamic random access memory (SDRAM) (volatile memory) is used for the first storage unit 26 and the first storage unit 30, while a low power double data rate (LPDDR) SDRAM (volatile memory) is used for the second storage unit 28 and the second storage unit 32. Alternatively, the LPDDR SDRAM (volatile memory) may be used for the first storage unit 26 and the first storage unit 30, while a magnetoresistive random access memory (MRAM) (non-volatile memory) may be used for the second storage unit 28 and the second storage unit 32. Alternatively, an SRAM (volatile memory) may be used for the first storage unit 26 and the first storage unit 30, while a ferroelectric random access memory (FeRAM) (non-volatile memory) may be used for the second storage unit 28 and the second storage unit 32.

The above-mentioned memories satisfying the above-mentioned condition may be used for each of the storage units (the first storage unit 26, the second storage unit 28, the first storage unit 30, and the second storage unit 32). The standard and combination of the memories used for the first storage unit 26 and the first storage unit 30, and the memories used for the second storage unit 28 and the second storage unit 32 are not limited to the above-mentioned specific examples.

Each of the first storage unit 26, the first storage unit 30, the second storage unit 28 and the second storage unit 32 is controlled such that the state thereof is changed to the active state or the inactive state. There is an overhead when the state of each of the storage units (the first storage unit 26, the first storage unit 30, the second storage unit 28 and the second storage unit 32) is changed to the active state or to the inactive state. The overhead is electric energy and time used for the state change. In general, the overhead is larger, as the difference in the power consumption between the states is larger. In addition, it takes much time for the state change, as the difference in the power consumption between the states is larger.

Therefore, it can be said that the frequent state change is unfit for the frequently-accessed storage unit. Accordingly, in the first embodiment, appropriate memories described above are selected for each of the storage units (the first storage unit 26, the second storage unit 28, the first storage unit 30, and the second storage unit 32) based on the predicted access frequency, and each of them is constructed on the selected memory.

It is supposed in the description below that the first storage unit 26 and the second storage unit 28 satisfy the relationship described below for simplifying the description. Specifically, the power consumption of the second storage unit 28 in the non-access state is lower than the power consumption of the first storage unit 26 in the non-access state. The first storage unit 26 operates at a higher speed than the second storage unit 28. The first storage unit 26 and the second storage unit 28 are supposed to be controlled to be in two types of states, which are the active state and the inactive state.

Similarly, it is supposed in the description below that the first storage unit 30 and the second storage unit 32 satisfy the relationship described below. Specifically, the power consumption of the second storage unit 32 in the non-access state is lower than the power consumption of the first storage unit 30 in the non-access state. The first storage unit 30 operates at a higher speed than the second storage unit 32. The first storage unit 30 and the second storage unit 32 are supposed to be controlled to be in two types of states, which are the active state and the inactive state.

The control unit 18 controls the I/F unit 14. In the first embodiment, the control unit 18 determines the priority of the packet received from the host I/F 22, and allows the first storage unit 26 or the second storage unit 28 to store the packet based on the determined priority. In addition, the control unit 18 determines the priority of the packet received from the NW I/F 24, and allows the first storage unit 30 or the second storage unit 32 to store the packet based on the determined priority.

More specifically, the control unit 18 includes a sorting unit 34, a transmission scheduler 36, a state control unit 38, a reception scheduler 40, and a sorting unit 42.

The sorting unit 34 sorts the packets inputted via the host I/F 22 by the priority of each packet. The sorting unit 34 determines the priority of the packet inputted via the host I/F 22. The sorting unit 34 stores the packet into one of the first storage unit 26 and the second storage unit 28 (either one of the first storage unit 26 and the second storage unit 28) according to the determined priority. In the first embodiment, the sorting unit 34 stores the packet whose determined priority is higher, i.e., whose determined priority is the first priority or higher, into the first storage unit 26. On the other hand, the sorting unit 34 stores the packet whose determined priority is lower, i.e., whose determined priority is lower than the first priority, into the second storage unit 28.

The sorting unit 42 sorts the packets inputted via the NW I/F 24 by the priority of each packet. The sorting unit 42 determines the priority of the packet inputted via the NW I/F 24. The sorting unit 42 stores the packet into one of the first storage unit 30 and the second storage unit 32 (either one of the first storage unit 30 and the second storage unit 32) according to the determined priority. In the first embodiment, the sorting unit 42 stores the packet whose determined priority is higher, i.e., whose determined priority is the first priority or higher, into the first storage unit 30. On the other hand, the sorting unit 42 stores the packet whose determined priority is lower, i.e., whose determined priority is lower than the first priority, into the second storage unit 32.

The priority means the priority of the packet (information), which is a subject to be stored in the first storage unit 26, the second storage unit 28, the first storage unit 30, and the second storage unit 32. In the first embodiment, the packet with the high priority that is the first priority or hither is stored in the first storage unit 26 or the first storage unit 30. On the other hand, the packet with the low priority that is lower than the first priority is stored in the second storage unit 28 or the second storage unit 32. The sorting unit 34 and the sorting unit 42 determine the priority. The sorting unit 34 and the sorting unit 42 determine the packet with a high reference frequency as the packet having the high priority. The sorting unit 34 and the sorting unit 42 also determine the packet with a low degree of importance as the packet having the high priority.

The reference frequency indicates the frequency that the packet is read and written. In the first embodiment, the sorting unit 34 and the sorting unit 42 determine that the packet with the higher reference frequency has a higher priority. On the other hand, the sorting unit 34 and the sorting unit 42 preferably store beforehand a higher priority in association with the reference frequency in a memory not illustrated, i.e., the sorting unit 34 and the sorting unit 42 store the higher priority, as the reference frequency is higher. The sorting unit 34 and the sorting unit 42 may determine the priority by reading the priority corresponding to the reference frequency of the packet.

Alternatively, the sorting unit 34 and the sorting unit 42 may read a value stored in a specific field of the packet as the reference frequency, so as to determine the priority. Specifically, the sorting unit 34 and the sorting unit 42 may use, as the reference frequency, the information that is stored in the TOS field in IPv4 packet, the Flow Label field in IPv6 packet, or a priority field of IEEE 802.1Q and that indicates the priority.

The sorting unit 34 and the sorting unit 42 may use the priority associated with an application executed by the device control unit 12 as the reference frequency. The priority of the application may preliminarily be set by a user, and may preliminarily be stored in a memory, not illustrated, of the sorting unit 34 and the sorting unit 42. The sorting unit 34 and the sorting unit 42 may determine the priority of the application according to the foreground execution or background execution. A priority management table having the priority of the application and the packets in association with each other is stored beforehand in the unillustrated memory of the sorting unit 34 and the sorting unit 42. The sorting unit 34 and the sorting unit 42 may read the priority corresponding to the accepted packet from the priority management table as the reference frequency.

The degree of importance is determined by a heavy impact caused by a loss of a packet. In other words, a high degree of importance is assigned to the packet that should not be lost. In order to prevent the important packet from being lost when the power source is turned off, the priority having the high degree of importance is intentionally determined to be low in order that it can be stored in the second storage unit 28 or the second storage unit 32, which use the non-volatile memory. Specifically, in the first embodiment, the sorting unit 34 and the sorting unit 42 determine that the priority of the packet having high degree of importance is low, and can store this packet into the second storage unit 28 or the second storage unit 32, which use the non-volatile memory, not into the first storage unit 26 or the first storage unit 30, which use the volatile memory.

A packet carrying control information, or a packet to a management function may be used as a determination reference for the degree of importance. Specifically, the sorting unit 34 and the sorting unit 42 determine that degree of importance of the packet carrying the control information is high, so that the priority thereof is low. On the other hand, the sorting unit 34 and the sorting unit 42 determine that the degree of importance of the packet to the management function is high, so that the priority thereof is low. Therefore, the packet carrying the control information and the packet to the management function are stored into the second storage unit 28 or the second storage unit 32, which uses the non-volatile memory, not into the first storage unit 26 or the first storage unit 30, which uses the volatile memory. Examples of the packet carrying the control information include a TCP packet to which SYN/FIN or PSH flag is set. Examples of the packet to the management function include an ICMP packet.

The sorting unit 34 and the sorting unit 42 may read a signal indicating the degree of importance of the information contained in the accepted packet from the packet, thereby acquiring the degree of importance of the packet.

The sorting unit 34 and the sorting unit 42 may determine the priority of the packet by combining the reference frequency and the degree of importance of the packet. The sorting unit 34 and the sorting unit 42 may also determine the priority of the packet based on the reference frequency, the degree of importance, and the other parameters of the packet.

Examples of the other parameters include an apparatus that transmits the accepted packet, an apparatus to which the accepted packet is to be transmitted, and a transmission/reception protocol.

In this case, the sorting unit 34 and the sorting unit 42 preliminarily store a priority management table, which determines a priority corresponding to the combination of the reference frequency, the degree of importance, and the other parameters, into the unillustrated memory. The sorting unit 34 and the sorting unit 42 may read the priority corresponding to the reference frequency, the degree of importance, and the other parameters of the accepted packet from the priority management table, thereby determining the priority.

It has been described that the above-mentioned priority management table is stored in the unillustrated memory of each of the sorting unit 34 and the sorting unit 42. However, a storage unit may separately be provided, and the priority management table may be stored in the storage unit. This is because the timings of the sorting unit 34 and the sorting unit 42 referring to the priority management table are different from the timings of the sorting unit 34 and the sorting unit 42 referring to the packet stored in each of the storage units (the first storage unit 26, the second storage unit 28, the first storage unit 30, and the second storage unit 32).

As described above, the sorting unit 34 and the sorting unit 42 determine the storage unit (the first storage unit 26, the first storage unit 30, the second storage unit 28 and the second storage unit 32) into which the packet is to be stored based on the priority of the packet. Then, the sorting unit 34 and the sorting unit 42 store the packet into the determined storage unit. The sorting unit 34 and the sorting unit 42 also output information indicating the priority of the accepted packet and information indicating the destination into which the accepted packet is to be stored to the state control unit 38.

The state control unit 38 controls the state of each of the first storage unit 26, the second storage unit 28, the first storage unit 30, and the second storage unit 32. In the first embodiment, the state control unit 38 controls each of the storage units (the first storage unit 26, the second storage unit 28, the first storage unit 30, and the second storage unit 32) to be in either one of the active state and the inactive state.

The state control unit 38 controls a voltage value of electric power supplied to each of the storage units (the first storage unit 26, the second storage unit 28, the first storage unit 30, and the second storage unit 32) from a power source not illustrated, and an operation clock. Thus, the state control unit 38 controls each of the storage units (the first storage unit 26, the second storage unit 28, the first storage unit 30, and the second storage unit 32) to be in either one of the active state and the inactive state.

The state control unit 38 includes a determination unit 39. The determination unit 39 determines whether or not a packet is currently continuously received from the host I/F 22 or the NW I/F 24. The phrase that "a packet is currently continuously received" means that the host I/F 22 (reception unit) or the NW I/F 24 (reception unit) receives a packet in an interval less than a predetermined time.

The state control unit 38 may be configured by a microprocessor on which a general-purpose program is operated, or by a dedicated communication circuit by which only a later-described specialized process for the process in the first embodiment is operated.

The transmission scheduler 36 extracts the packet stored in the first storage unit 26 and the second storage unit 28 in the storage unit 16 in descending order of priority, and transmits the same to the NW I/F 24. Specifically, the transmission scheduler 36 reads the packet, one by one, from the first storage unit 26 that stores a packet having the high priority, out of the first storage unit 26 and the second storage unit 28, and transmits the same to the NW I/F 24. The transmission scheduler 36 also outputs the information indicating the first storage unit 26 or the second storage unit 28 into which the transmitted packet is stored, and the information indicating the transmission of the packet, to the state control unit 38.

The reception scheduler 40 extracts the packet stored in the first storage unit 30 and the second storage unit 32 in the storage unit 20 in descending order of priority, and transmits the same to the host I/F 22. Specifically, the reception scheduler 40 reads the packet, one by one, from the first storage unit 30 that stores a packet having the high priority, out of the first storage unit 30 and the second storage unit 32, and transmits the same to the host I/F 22. The reception scheduler 40 also outputs the information indicating the first storage unit 30 or the second storage unit 32 into which the transmitted packet is stored, and the information indicating the transmission of the packet, to the state control unit 38.

A procedure of a transmission process executed by the I/F unit 14 will next be described.

Figure 3:
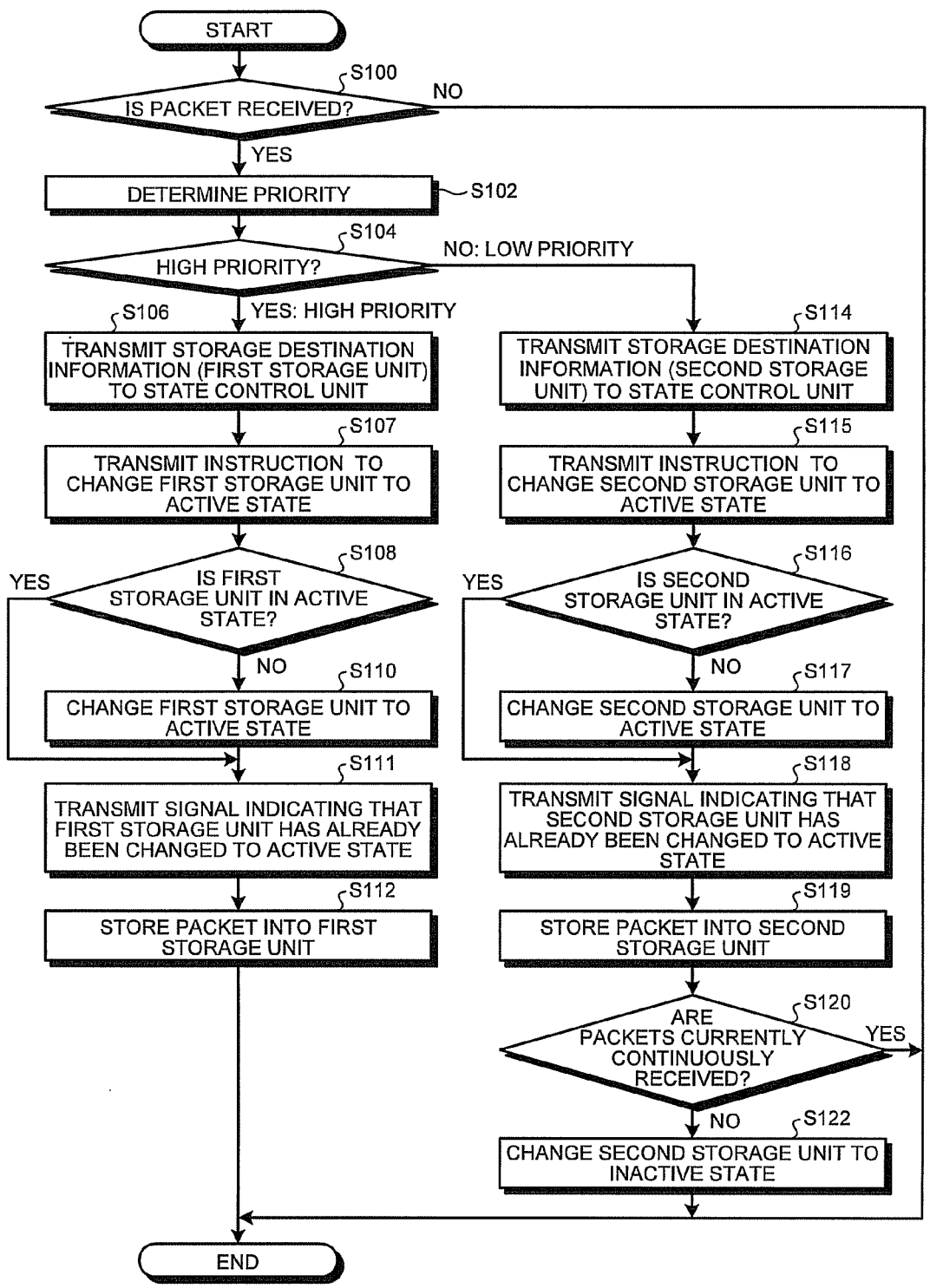
FIG. 3 is a flowchart illustrating a packet storage process according to the first embodiment.

A packet storage process in the transmission process executed by the I/F unit 14 will firstly be described. FIG. 3 is a flowchart illustrating a procedure of the packet storage process in the transmission process executed by the I/F unit 14.

When receiving a notification at a predetermined time interval, or receiving a notification from the host I/F 22, the sorting unit 34 determines whether or not it receives a packet from the host I/F 22 (step S100). The packet received from the host I/F 22 is a packet that is transmitted by the device control unit 12 to the external device via the I/F unit 14.

When a negative determination is made in step S100 (step S100: No), the present routine is ended, and when a positive determination is made (step S100: Yes), the process proceeds to step S102.

Next, the sorting unit 34 determines the priority of the packet accepted from the host I/F 22 (step S102). The priority is determined by the manner described above.

Then, the sorting unit 34 determines whether or not the priority of the packet determined in step S102 is a high priority that is the first priority set beforehand or higher priority (step S104). When the priority of the packet determined in step S102 is the high priority, a positive determination is made (step S104: Yes), and then, the process proceeds to step S106.

Next, the sorting unit 34 transmits, to the state control unit 38, information indicating the first storage unit 26 that is the storage unit corresponding to the high priority out of the first storage unit 26 and the second storage unit 28 as storage destination information indicating the destination to which the packet is to be stored (step S106).

Then, the sorting unit 34 transmits a change instruction, indicating that the state of the first storage unit 26 is changed to the active state, to the state control unit 38 (step S107).

Next, the state control unit 38 determines whether or not the first storage unit 26 that is the destination to which the packet is to be stored is in the active state (step S108). For example, the state control unit 38 stores state information indicating that the first storage unit 26 and the second storage unit 28 are in the active state or in the inactive state. The state control unit 38 updates the state information to the state information indicating the controlled state, every time the state control unit 38 controls the state of the first storage unit 26 or the second storage unit 28. The state control unit 38 may determine whether or not the first storage unit 26 is in the active state by reading the state information corresponding to the first storage unit 26 that is the destination to which the packet is to be stored. The determination method in step S108 is not limited to the method described above.

When determining that the first storage unit 26 is in the active state (step S108: Yes), the state control unit 38 transmits a changed signal, indicating that the first storage unit 26 has already been changed to the active state, to the sorting unit 34 (step S111). On the other hand, when the state control unit 38 determines that the first storage unit 26 is not in the active state, i.e., in the inactive state in the determination in step S108 (step S108: No), the process proceeds to step S110.

The state control unit 38 changes the first storage unit 26 to the active state from the inactive state (step S110). Then, the process proceeds to step S111.

When accepting the changed signal indicating that the first storage unit 26 has already been changed to the active state in step S111, the sorting unit 34 stores the packet, which is determined to have the high priority in step S102, into the first storage unit 26 (step S112). Then, this routine is ended.

On the other hand, when the priority of the packet determined in step S102 is the low priority that is lower than the first priority, the negative determination is made in step S104 (step S104: No), and then, the process proceeds to step S114.

In step S114, the sorting unit 34 transmits, to the state control unit 38, information indicating the second storage unit 28 that is the storage unit corresponding to the low priority out of the first storage unit 26 and the second storage unit 28 as storage destination information indicating the destination to which the packet is to be stored (step S114).

Then, the sorting unit 34 transmits a change instruction, indicating that the state of the second storage unit 28 is changed to the active state, to the state control unit 38 (step S115).

Next, the state control unit 38 determines whether or not the second storage unit 28 that is the destination to which the packet is to be stored is in the active state (step S116). For example, the state control unit 38 stores state information indicating that the first storage unit 26 and the second storage unit 28 are in the active state or in the inactive state. The state control unit 38 updates the state information to the state information indicating the controlled state, every time the state control unit 38 controls the state of the first storage unit 26 or the second storage unit 28. The state control unit 38 may determine whether or not the second storage unit 28 is in the active state by reading the state information corresponding to the second storage unit 28 that is the destination to which the packet is to be stored.

When determining that the second storage unit 28 is in the active state (step S116: Yes), the state control unit 38 transmits a changed signal, indicating that the second storage unit 28 has already been changed to the active state, to the sorting unit 34 (step S118). On the other hand, the state control unit 38 determines that the second storage unit 28 is not in the active state, i.e., in the inactive state in the determination in step S116 (step S116: No), the process proceeds to step S117.

The state control unit 38 changes the second storage unit 28 to the active state from the inactive state (step S117). Then, the process proceeds to step S118.

When accepting the changed signal indicating that the second storage unit 28 has already been changed to the active state according to the process in step S118, the sorting unit 34 stores the packet, which is determined to have the low priority in step S102, into the second storage unit 28 (step S119).

Next, the determination unit 39 in the state control unit 38 determines whether or not packets are currently continuously received from the host I/F 22 in step S120. When it is determined that packets are currently continuously received (step S120: Yes), this routine is ended.

On the other hand, when it is determined that packets are not currently continuously received, i.e., when the determination unit 39 detects the last timing of the packet group continuously received, a negative determination is made (step S120: No). Then, the process proceeds to step S122. A method described below is employed for detecting the last timing of the packet group continuously received in step S120. For example, the determination unit 39 determines the last timing by using a method of managing a reference interval with a timer, or a method of considering a protocol sequence of a packet. Examples of the method of considering the protocol sequence include a method of detecting an end of a TCP connection, and a method in which a correspondence relationship between an HTTP request and a response is grasped, and it is confirmed the responses to all requests are acquired.

In step S122, after the state control unit 38 changes the second storage unit 28 to the inactive state from the active state (step S122), this routine is ended.

Figure 4:
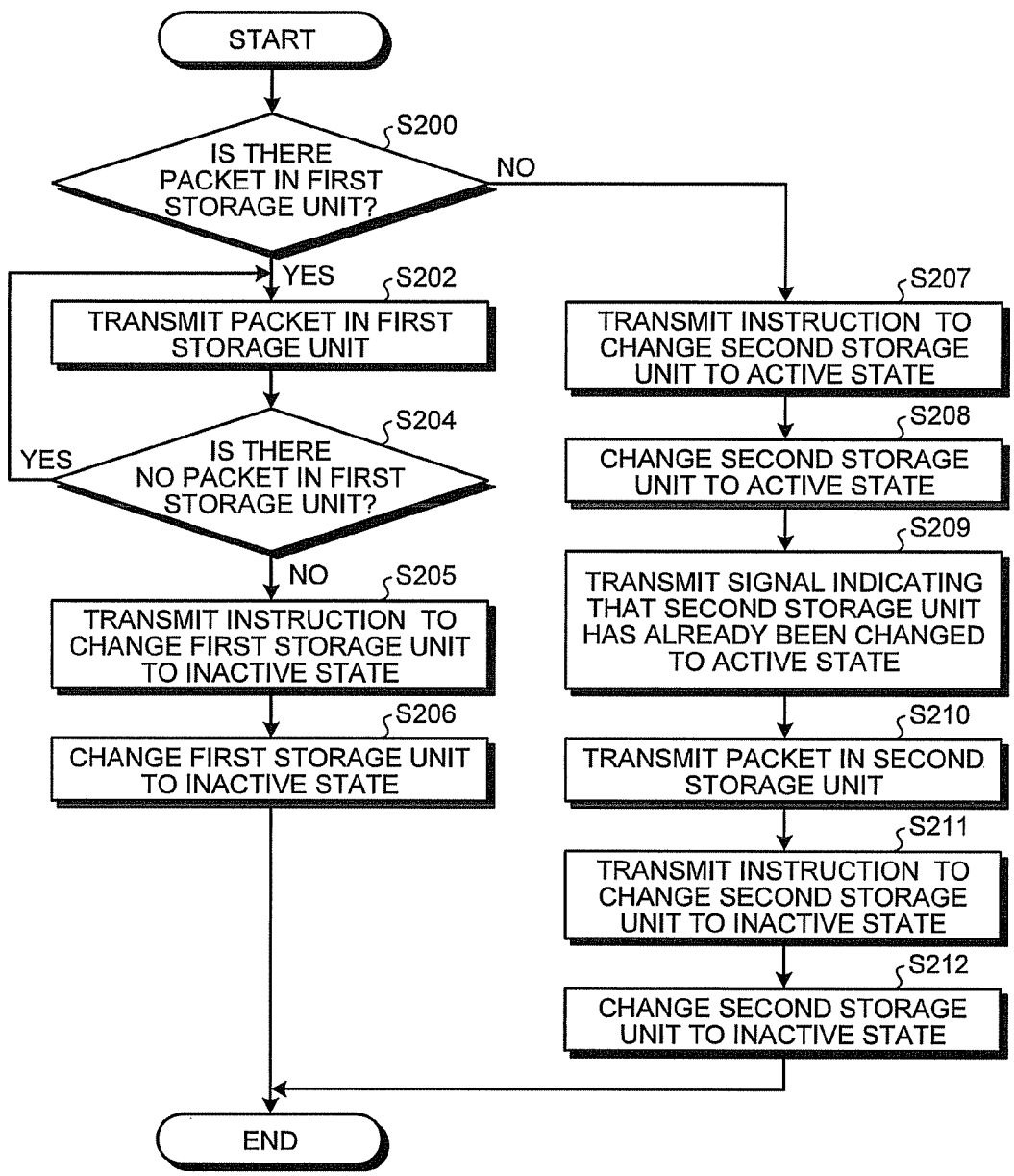
FIG. 4 is a flowchart illustrating a packet transmission process according to the first embodiment.

Subsequently, a packet transmission process in the transmission process executed by the I/F unit 14 will be described. FIG. 4 is a flowchart illustrating a procedure of the packet transmission process in the transmission process executed by the I/F unit 14.

Firstly, the transmission scheduler 36 monitors the storage unit 16, and determines whether or not a packet is stored in the first storage unit 26 (step S200). When determining that the packet is stored in the first storage unit 26 (step S200: Yes), the transmission scheduler 36 transmits the packet stored in the first storage unit 26 to the external device via the NW I/F 24 (step S202).

Then, the transmission scheduler 36 determines whether there is no packet in the first storage unit 26 (step S204). Specifically, the transmission scheduler 36 determines whether or not all processes to the information stored in the first storage unit 26 are ended in step S204. When the packet is stored in the first storage unit 26, a positive determination is made (step S204: Yes), and then, the process returns to step S202. On the other hand, when there is no packet in the first storage unit 26, a negative determination is made (step S204: No), and then, the process proceeds to step S205.

In step S205, the transmission scheduler 36 transmits a state change instruction, indicating that the first storage unit 26 is changed to the inactive state, to the state control unit 38 (step S205).

When accepting the change instruction indicating that the first storage unit 26 is changed to the inactive state, the state control unit 38 changes the first storage unit 26 to the inactive state from the active state (step S206). Then, this routine is ended.

In case where the sorting unit 34 determines the packet with the high priority when the state control unit 38 accepts the information indicating that the packet in the first storage unit 26 has already been transmitted, this routine may be ended without the execution of the process in step S206. The determination as to whether the sorting unit 34 determines the packet with the high priority may be made by the determination as to whether the information indicating that the first storage unit 26 is the storage destination of the packet is accepted from the sorting unit 34.

The packet having the high priority and stored in the first storage unit 26 is promptly transmitted according to the processes in steps S200 to S206. Therefore, the possibility that the first storage unit 26 is again accessed in a short period is high, compared to the second storage unit 28. Accordingly, as indicated in steps S200 to S206, the state control unit 38 does not change the first storage unit 26 to the inactive state after the packet is stored in the first storage unit 26 in step S112. Specifically, the state control unit 38 controls to keep the first storage unit 26 in the active state after the packet is stored in the first storage unit 26 in step S112.

It is supposed that the storage unit (the first storage unit 26, the second storage unit 28, the first storage unit 30, and the second storage unit 32) in the first embodiment assumes three or more types of states. In this case, the state control unit 38 only needs to control to keep the first storage unit 26 in a state in which the state change is finished in a predetermined time or in a time calculated from an access interval in the past, so that a power-saving effect is determined to be attained, instead of the control to hold the first storage unit 26 in the active state. The condition in which the state change is finished in the time calculated from the access interval in the past means a series of process in which the state is temporarily changed to a low power consumption state, this state is kept for some time, and then, the state is again returned to the accessible state.

On the other hand, when the negative determination is made in step S200 (step S200: No), i.e., when there is no packet in the first storage unit 26, the process proceeds to step S207. In step S07, the transmission scheduler 36 transmits the change instruction for changing the second storage unit 28 to the active state to the state control unit 38 (step S207).

The state control unit 38 that accepts the change instruction for changing the second storage unit 28 to the active state changes the second storage unit 28 to the active state from the inactive state (step S208). Then, the state control unit 38 transmits the changed signal, indicating that the second storage unit 28 has already been changed to the active state, to the transmission scheduler 36 (step S209).

Next, the transmission scheduler 36 reads the packet from the second storage unit 28, and transmits the same to the external device via the NW I/F 24 (step S210). The transmission scheduler 36 may read and transmit packets in a predetermined number stored in the second storage unit 28, or may read and transmit all packets stored in the second storage unit 28 in the process in step S210. The number of the packets read by the transmission scheduler 36 may preliminarily be set in the process in step S210.

Next, the transmission scheduler 36 transmits the change instruction for changing the second storage unit 28 to the inactive state to the state control unit 38 (step S211). The state control unit 38 accepting the change instruction changes the second storage unit 28 to the inactive state (step S212), and then, ends this routine.

As indicated in the processes in steps S200 to S212, the packet having the low priority and stored in the second storage unit 28 is transmitted after the packet with the high priority stored in the first storage unit 26 is transmitted. Therefore, the time from when the packet with the low priority is stored in the second storage unit 28 to when the same packet is transmitted is longer than the time from when the packet with the high priority is stored in the first storage unit 26 to when the same packet is transmitted. Accordingly, in the present embodiment, every time the packet with the low priority is stored in the second storage unit 28, the second storage unit 28 is controlled to be changed to the inactive state.

However, in traffic of packets with the low priority, the transmission and reception of plural packets are concentrated in a short period, and the concentrated packet group tends to be generated sporadically, as in the case of browsing of website by use of a web browser. In this case, the storage time might be short in the packet group, and the time from when the packet group is stored to when the next packet group is stored might be long. Therefore, the state control unit 38 may detect the last timing of the packet group continuously received, and may change the storage unit (e.g., the first storage unit 26 or the second storage unit 28) into which the packet is stored to the inactive state. The determination of the last timing of a packet group continuously received may be made by using a method of managing a reference interval with a timer, or a method of considering a protocol sequence of a packet. Examples of the method of considering the protocol sequence of a packet include a method of detecting an end of a TCP connection, and a method in which a correspondence relationship between an HTTP request and a response is grasped, and it is confirmed the responses to all requests are acquired.

In the above description, the transmission scheduler 36 always reads and transmits the packet from the first storage unit 26 during when the packet is stored in the first storage unit 26 in the processes in steps S200 to S204. However, the transmission scheduler 36 only needs to transmit the packet one by one from the packet having the higher priority. The transmission method is not limited to the method described above.

For example, the transmission scheduler 36 may transmit one packet stored in the second storage unit 28 after transmitting N (N is an integer of 1 or more) packets stored in the first storage unit 26.

Subsequently, a procedure of the reception process executed by the I/F unit 14 will be described. Firstly, a packet storage process in the reception process executed by the I/F unit 14 will be described.

Figure 5:
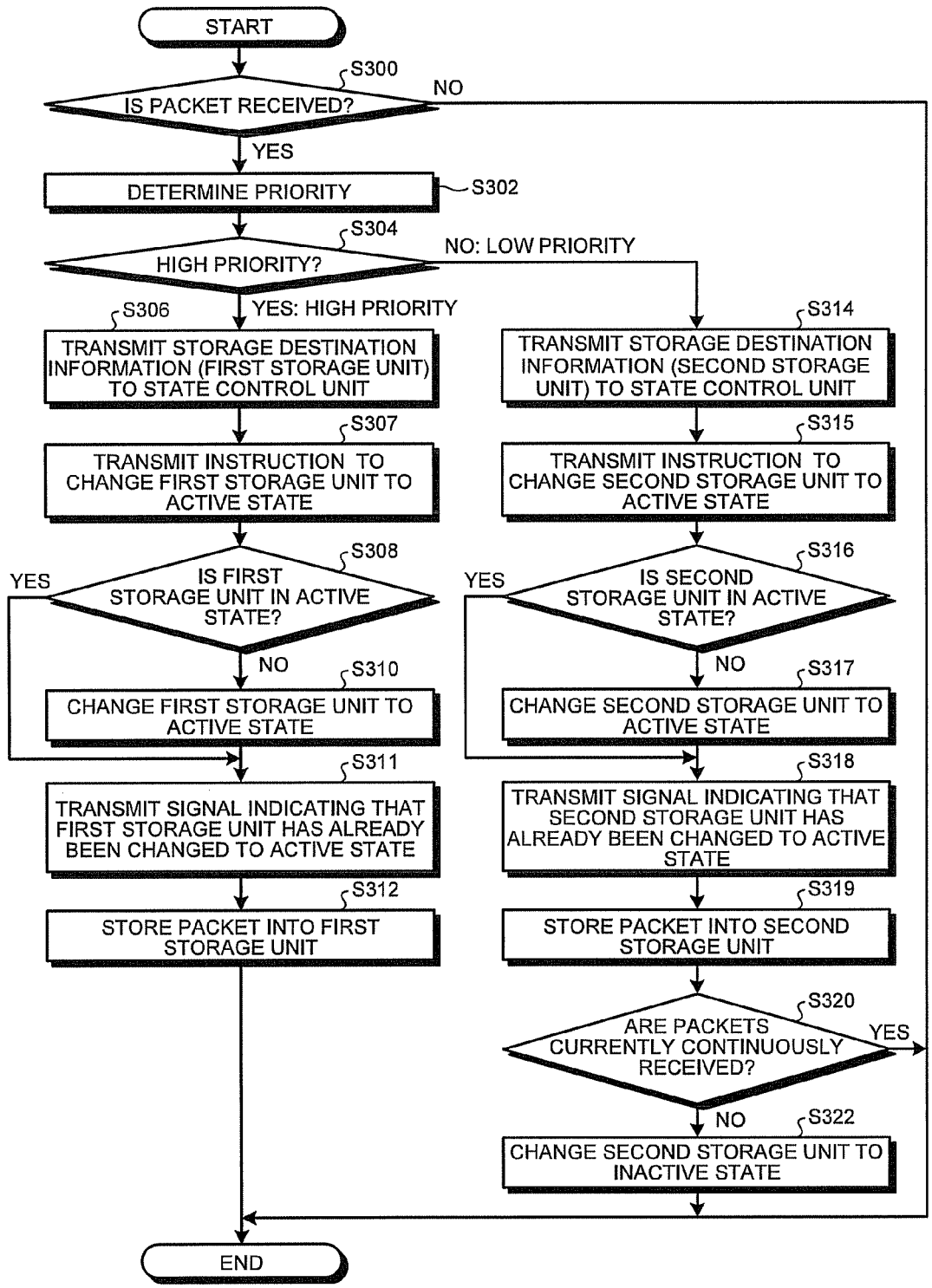
FIG. 5 is a flowchart illustrating another packet storage process according to the first embodiment.

FIG. 5 is a flowchart illustrating a procedure of another packet storage process in the reception process executed by the I/F unit 14.

When receiving the notification at a predetermined time interval, or receiving the notification from the NW I/F 24, the sorting unit 42 determines whether or not a packet is received from the NW I/F 24 (step S300). The packet received from the NW I/F 24 is a packet transmitted to the device control unit 12 from the external device via the network and the I/F unit 14.

When a negative determination is made in step S300 (step S300: No), the present routine is ended, and when a positive determination is made (step S300: Yes), the process proceeds to step S302.

Next, the sorting unit 42 determines the priority of the packet accepted from the NW I/F 24 (step S302). The priority is determined by the manner described above.

Then, the sorting unit 42 determines whether the priority of the packet determined in step S302 is a high priority that is the first priority set beforehand or higher (step S304). When the priority of the packet determined in step S302 is the high priority, a positive determination is made (step S304: Yes), and then, the process proceeds to step S306.

Next, the sorting unit 42 transmits, to the state control unit 38, information indicating the first storage unit 30 that is the storage unit corresponding to the high priority out of the first storage unit 30 and the second storage unit 32 as storage destination information indicating the destination to which the packet is to be stored (step S306).

Then, the sorting unit 42 transmits a change instruction, indicating that the state of the first storage unit 30 is changed to the active state, to the state control unit 38 (step S307).

Next, the state control unit 38 determines whether or not the first storage unit 30 that is the destination to which the packet is to be stored is in the active state (step S308). For example, the state control unit 38 stores state information indicating that the first storage unit 30 and the second storage unit 32 are in the active state or in the inactive state. The state control unit 38 updates the state information to the state information indicating the controlled state, every time the state control unit 38 controls the state of the first storage unit 30 or the second storage unit 32. The state control unit 38 may determine whether or not the first storage unit 30 is in the active state by reading the state information corresponding to the first storage unit 30 that is the destination to which the packet is to be stored.

When determining that the first storage unit 30 is in the active state (step S308: Yes), the state control unit 38 transmits a changed signal, indicating that the first storage unit 30 has already been changed to the active state, to the sorting unit 42 (step S311). On the other hand, when the state control unit 38 determines that the first storage unit 30 is not in the active state, i.e., in the inactive state in the determination in step S308 (step S308: No), the process proceeds to step S310.

In step S310, the state control unit 38 changes the first storage unit 30 to the active state from the inactive state (step S310). Then, the process proceeds to step S311.

When accepting the changed signal, indicating that the first storage unit 30 has already been changed to the active state by the process in step S311, the sorting unit 42 stores the packet, which is determined to have the high priority in step S302, into the first storage unit 30 (step S312). Then, this routine is ended.

On the other hand, when the priority of the packet determined in step S302 is the low priority that is lower than the first priority, the negative determination is made in step S304 (step S304: No), and then, the process proceeds to step S314.

In step S314, the sorting unit 42 transmits, to the state control unit 38, information indicating the second storage unit 32 that is the storage unit corresponding to the low priority out of the first storage unit 30 and the second storage unit 32 as storage destination information indicating the destination to which the packet is to be stored (step S314).

Then, the sorting unit 42 transmits a change instruction, indicating that the state of the second storage unit 32 is changed to the active state, to the state control unit 38 (step S315).

Next, the state control unit 38 determines whether or not the second storage unit 32 that is the destination to which the packet is to be stored is in the active state (step S316). For example, the state control unit 38 stores state information indicating that the first storage unit 30 and the second storage unit 32 are in the active state or in the inactive state. The state control unit 38 updates the state information to the state information indicating the controlled state, every time the state control unit 38 controls the state of the first storage unit 30 or the second storage unit 32. The state control unit 38 may determine whether or not the second storage unit 32 is in the active state by reading the state information corresponding to the second storage unit 32 that is the destination to which the packet is to be stored.

When determining that the second storage unit 32 is in the active state (step S316: Yes), the state control unit 38 transmits a changed signal, indicating that the second storage unit 32 has already been changed to the active state, to the sorting unit 42 (step S318). On the other hand, when the state control unit 38 determines that the second storage unit 32 is not in the active state, i.e., in the inactive state in the determination in step S316 (step S316: No), the process proceeds to step S317.

In step S317, the state control unit 38 changes the second storage unit 32 to the active state from the inactive state (step S317). Then, the process proceeds to step S318.

When accepting the changed signal indicating that the second storage unit 32 has already been changed to the active state according to the process in step S318, the sorting unit 42 stores the packet, which is determined to have the low priority in step S302, into the second storage unit 32 (step S319).

Next, it is determined in step S320 whether or not packets are currently continuously received from the NW I/F 24 as in step S120 (step S320). When it is determined that packets are currently continuously received (step S320: Yes), this routine is ended.

On the other hand, when it is determined that packets are not currently continuously received, i.e., when the determination unit 39 detects the last timing of the packet group continuously received, a negative determination is made (step S320: No). Then, the process proceeds to step S322.

In step S322, after the state control unit 38 changes the second storage unit 32 to the inactive state from the active state (step S322), this routine is ended.

Figure 6:
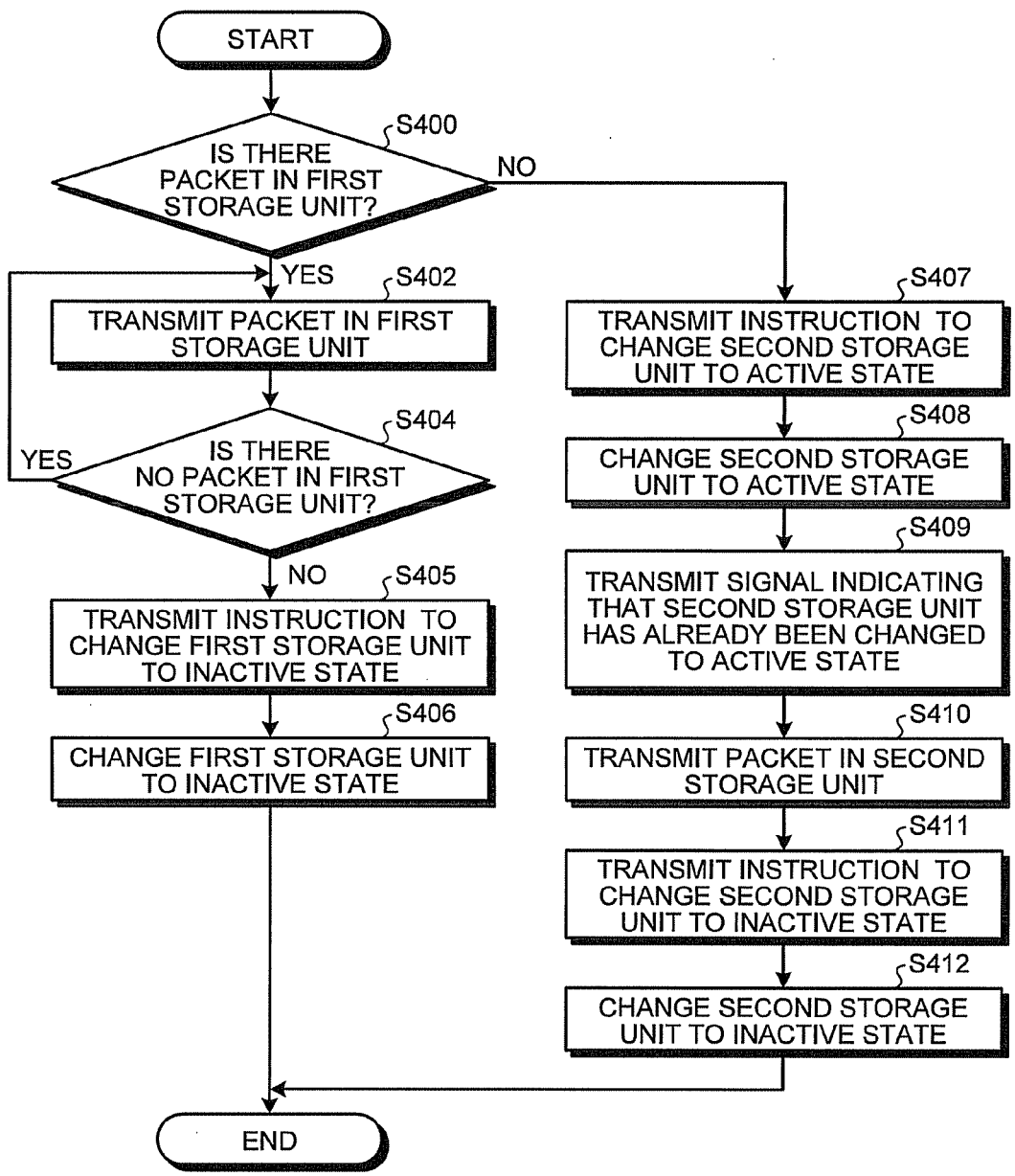
FIG. 6 is a flowchart illustrating a packet reception process according to the first embodiment.

Subsequently, a packet reception process in the reception process executed by the I/F unit 14 will be described. FIG. 6 is a flowchart illustrating a procedure of the packet reception process in the reception process executed by the I/F unit 14.

Firstly, the reception scheduler 40 monitors the storage unit 20, and determines whether or not a packet is stored in the first storage unit 30 (step S400). When determining that the packet is stored in the first storage unit 30 (step S400: Yes), the reception scheduler 40 transmits the packet stored in the first storage unit 30 to the device control unit 12 via the host I/F 22 (step S402).

Then, the reception scheduler 40 determines whether there is no packet in the first storage unit 30 (step S404). Specifically, the reception scheduler 40 determines whether or not all processes to the information stored in the first storage unit 30 are ended in step S404. When the packet is stored in the first storage unit 30, a positive determination is made (step S404: Yes), and then, the process returns to step S402. On the other hand, when there is no packet in the first storage unit 30, a negative determination is made (step S404: No), and then, the process proceeds to step S405.

In step S405, the reception scheduler 40 transmits a change instruction, indicating that the first storage unit 30 is changed to the inactive state, to the state control unit 38 (step S405).

When accepting the change instruction indicating that the first storage unit 30 is changed to the inactive state, the state control unit 38 changes the first storage unit 30 to the inactive state from the active state (step S406). Then, this routine is ended.

In case where the sorting unit 42 determines the packet with the high priority when the state control unit 38 accepts the information indicating that the packet in the first storage unit 30 has already been transmitted, this routine may be ended without the execution of the process in step S406. The determination as to whether or not the sorting unit 42 determines the packet with the high priority may be made by the determination as to whether or not the information indicating that the first storage unit 30 is the storage destination of the packet is accepted from the sorting unit 42.

On the other hand, when the negative determination is made in step S400 (step S400: No), i.e., when there is no packet in the first storage unit 30, the process proceeds to step S407. In step S407, the reception scheduler 40 transmits the change instruction for changing the second storage unit 32 to the active state to the state control unit 38 (step S407).

The state control unit 38 that accepts the change instruction for changing the second storage unit 32 to the active state changes the second storage unit 32 to the active state from the inactive state (step S408). Then, the state control unit 38 transmits the changed signal, indicating that the second storage unit 32 has already been changed to the active state, to the reception scheduler 40 (step S409).

Next, the reception scheduler 40 reads the packet from the second storage unit 32, and transmits the same to the device control unit 12 via the host I/F 22 (step S410). The reception scheduler 40 may read and transmit packets in a predetermined number stored in the second storage unit 32, or may read and transmit all packets stored in the second storage unit 32 in the process in step S410. The number of the packets read by the reception scheduler 40 may preliminarily be set in the process in step S410.

Next, the reception scheduler 40 transmits the change instruction for changing the second storage unit 32 to the inactive state to the state control unit 38 (step S411). The state control unit 38 accepting the change instruction changes the second storage unit 32 to the inactive state (step S412), and then, ends this routine.

In the above description, the reception scheduler 40 always reads and transmits the packet from the first storage unit 30 during when the packet is stored in the first storage unit 30 in the processes in steps S400 to S404. However, the reception scheduler 40 only needs to transmit the packet one by one from the packet having the higher priority. The transmission method is not limited to the method described above.

For example, the reception scheduler 40 may transmit one packet stored in the second storage unit 32 after transmitting N (N is an integer of 1 or more) packets stored in the first storage unit 30.

As described above, in the I/F unit 14 in the information processing device 10 according to the present embodiment, when the packet accepted from the device control unit 12 has the high priority that is the first priority or higher, the first storage unit 26 becomes in the active state, and then, the packet is stored in the first storage unit 26 according to the execution of the processes in steps S100 to S122. When the packet accepted from the device control unit 12 has the low priority that is lower than the first priority, the I/F unit 14 allows the second storage unit 28 to be in the active state, and then, stores the packet into the second storage unit 28.

In the I/F unit 14 in the information processing device 10, when the packet accepted from the external device has the high priority that is the first priority or higher, the first storage unit 30 becomes in the active state, and then, the packet is stored in the first storage unit 30 according to the execution of the processes in steps S300 to S322. When the packet accepted from the external device has the low priority that is lower than the first priority, the I/F unit 14 allows the second storage unit 32 to be in the active state, and then, stores the packet into the second storage unit 32.

As described above, the information processing device 10 according to the first embodiment determines the priority of the packet that is the information to be stored, and stores the packet into the first storage unit 26 and the first storage unit 30, or into the second storage unit 28 and the second storage unit 32 based on the determined priority. Accordingly, the information processing device 10 can sort the pieces of information to be stored into plural types of storage units, each having different power consumption, according to the priority, thereby being capable of realizing power-saving of the information processing device 10 and a performance retention of the information processing device 10.

The information processing device 10 according to the first embodiment can suppress an increase in cost caused by the use of high-performance storage unit, while reducing performance and power consumption of the whole information processing device 10.

In the information processing device 10 according to the first embodiment, a packet with a high priority, i.e., information with a high priority, is stored in the first storage unit 26 or in the first storage unit 30. In the information processing device 10, a packet with a low priority, i.e., information with low a priority, is stored in the second storage unit 28 and in the second storage unit 32, which have lower power consumption in the non-access state compared to the first storage unit 26 and the first storage unit 30. Therefore, the power-saving of the information processing device 10 and the performance retention of the information processing device 10 can both be realized effectively.

In the I/F unit 14 in the information processing device 10 according to the first embodiment, the first storage unit 26 and the first storage unit 30, which each have high power consumption but are high-speed memories compared to the second storage unit 28 and the second storage unit 32, are used as the storage units for storing a packet that is read after being stored in a shorter period. The I/F unit 14 makes a control to change the first storage unit 26 or the first storage unit 30 to the inactive state from the active state, after the transmission of the packet stored in the first storage unit 26 or the first storage unit 30 is completed.

Accordingly, the information processing device 10 according to the first embodiment can secure performance required as the information processing device 10, while reducing overhead caused by the frequent state change.

In the I/F unit 14 in the information processing device 10 according to the first embodiment, the second storage unit 28 and the second storage unit 32, which are low-speed memories but have lower power consumption compared to the first storage unit 26 and the first storage unit 30, are used as the storage units for storing a packet that is read after being stored in a longer period. Accordingly, the electric energy needed to retain the packet stored in the second storage unit 28 and the second storage unit 32 into the second storage unit 28 and the second storage unit 32 can be reduced.

The information processing device 10 according to the first embodiment determines that a packet with a high reference frequency is a packet with the high priority. The information processing device 10 stores the packet with the high priority into the first storage unit 26 or into the first storage unit 30, while stores the packet with the low priority into the second storage unit 28 or the second storage unit 32.

Consequently, a packet that has high processing priority, and has high possibility of being referred to after a relatively short period and a packet that has low processing priority, and has high possibility of being referred to after a relatively long period are distinguished, and the places for storing each of these packets can be adjusted. Therefore, the information processing device 10 can suppress deterioration in performance caused by the presence of plural types of storage units, each having different power consumption, and can reduce power consumption.

In the information processing device 10 according to the first embodiment, a high degree of importance is assigned to the packet that should not be lost. In order to prevent the important packet from being lost when the power source is turned off, the priority of the packet having the high degree of importance is intentionally determined to be low in order that it can be stored in the second storage unit 28 or the second storage unit 32, which uses the non-volatile memory. Specifically, in the present embodiment, the sorting unit 34 and the sorting unit 42 determine that the priority of the packet having high degree of importance is low, and can store this packet into the second storage unit 28 and the second storage unit 32, which uses the non-volatile memory, not into the first storage unit 26 and the first storage unit 30, which uses the volatile memory.

By virtue of this configuration, the volatile memory is used as the first storage unit 26 or the first storage unit 30, while the non-volatile memory is used as the second storage unit 28 or the second storage unit 32, and the packet having high degree of importance can be stored in the non-volatile memory. Accordingly, a risk of loss of information upon loss of power can be reduced.

In the first embodiment, when the determination unit 39 determines that packets are currently continuously received from the host I/F 22, the active state of the second storage unit 28 is kept in step S122. However, in the packet storage process in FIG. 3, the processes in steps S120 and S122 may be interrupted at a predetermined time interval. In this case, the determination unit 39 may determine whether or not packets are currently continuously received from the host I/F 22 by analyzing the protocol of the packet received by the I/F unit 14 or the address of the transmission source of the packet received by the I/F unit 14.

After the sorting unit 34 stores the packet into the second storage unit 28 by the process in step S119, and before the determination unit 39 makes the determination process in step S122, the determination process for determining whether or not the packet is stored in the first storage unit 26 by the state control unit 38 may be made. When the state control unit 38 determines that the packet is not stored in the first storage unit 26, the present routine is ended without the execution of the processes in steps S120 and S122. When the state control unit 38 determines that the packet is stored in the first storage unit 26, the processes in steps S120 and S122 may be executed. By virtue of this process, the second storage unit 28 can be kept to be in the active state without being changed to the inactive state, when the packet is stored in the second storage unit 28, and the packet is not stored in the first storage unit 26.

A monitor determination unit may separately be provided, and the determination process executed by the state control unit 38 may be executed by the monitor determination unit.

Second Embodiment

In a second embodiment, an information processing device 10A different from the information processing device 10 according to the first embodiment will be described.

Figure 7:
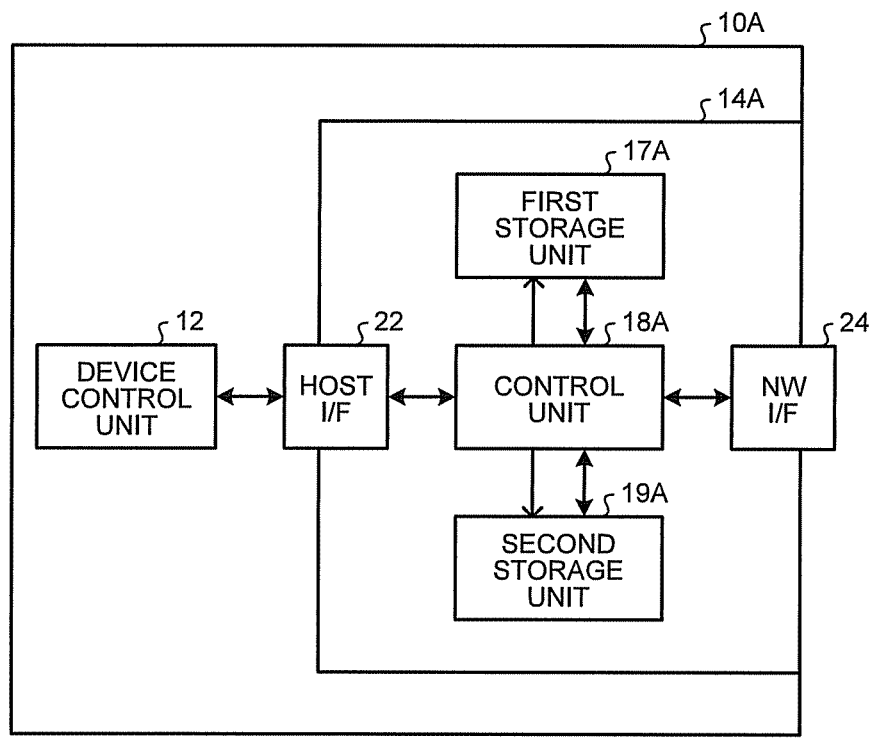
FIG. 7 is a diagram illustrating an information processing device according to a second embodiment.

FIG. 7 is a block diagram illustrating a functional configuration of the information processing device 10A according to the second embodiment.

The information processing device 10A includes the device control unit 12, and an I/F unit 14A. The I/F unit 14A includes the host I/F 22, the NW I/F 24, a first storage unit 17A, a control unit 18A, and a second storage unit 19A. The host I/F 22 and the NW I/F 24 are the same as those in the first embodiment.

The first storage unit 17A and the second storage unit 19A temporarily store information received from the external device through network and information transmitted to the external device from the device control unit 12. Specifically, each of the first storage unit 17A and the second storage unit 19A functions as a buffer for absorbing the difference in the transfer speed between the host I/F 22 and the NW I/F 24.

The relationship between the first storage unit 17A and the second storage unit 19A and their functions are the same as the relationship between the first storage unit 26 and the second storage unit 28, the relationship between the first storage unit 30 and the second storage unit 32, and their functions described in the first embodiment.

In the present embodiment, the relationship between the first storage unit 17A and the second storage unit 19A and their functions satisfy the relationship and function described below, for example. In the second embodiment, the first storage unit 17A and the second storage unit 19A have different power consumption, and the power consumption of the second storage unit 19A in a non-access state is lower than the power consumption of the first storage unit 17A in the non-access state. The first storage unit 17A operates at a higher speed than the second storage unit 19A. The first storage unit 17A and the second storage unit 19A are controlled to be in two types of states, which are an active state and an inactive state.

The I/F unit 14A may be configured to include plural storage units, each having different power consumption. The I/F unit 14A is not limited to have the configuration including two types of storage units that are the first storage unit 17A and the second storage unit 19A. The types of the states that the first storage unit 17A and the second storage unit 19A can assume are not limited to two, i.e., not limited to the active state and the inactive state.

The control unit 18A is a computer configured by including a CPU, a ROM, and a RAM, and controls the whole I/F unit 14A. Specifically, the control unit 18A controls to normally execute the transmission/reception process performed through the host I/F 22 and the NW I/F 24. The control unit 18A determines the priority of the information accepted from the host I/F 22 or the NW I/F 24. The control unit 18A controls such that the information whose determined priority is higher than a first priority is stored in the first storage unit 17A, while the information whose determined priority is lower than the first priority is stored in the second storage unit 19A.

FIG. 7 illustrates that the control unit 18A is electrically connected to the first storage unit 17A, the second storage unit 19A, the host I/F 22, and the NW I/F 24. However, in addition to the configuration illustrated in FIG. 7, the host I/F 22 and the first and second storage units 17A and 19A, and the NW I/F 24 and the first and second storage units 17A and 19A may electrically be connected with a bus.

Subsequently, a procedure of the transmission/reception process executed by the I/F unit 14A will be described.

Figure 8:
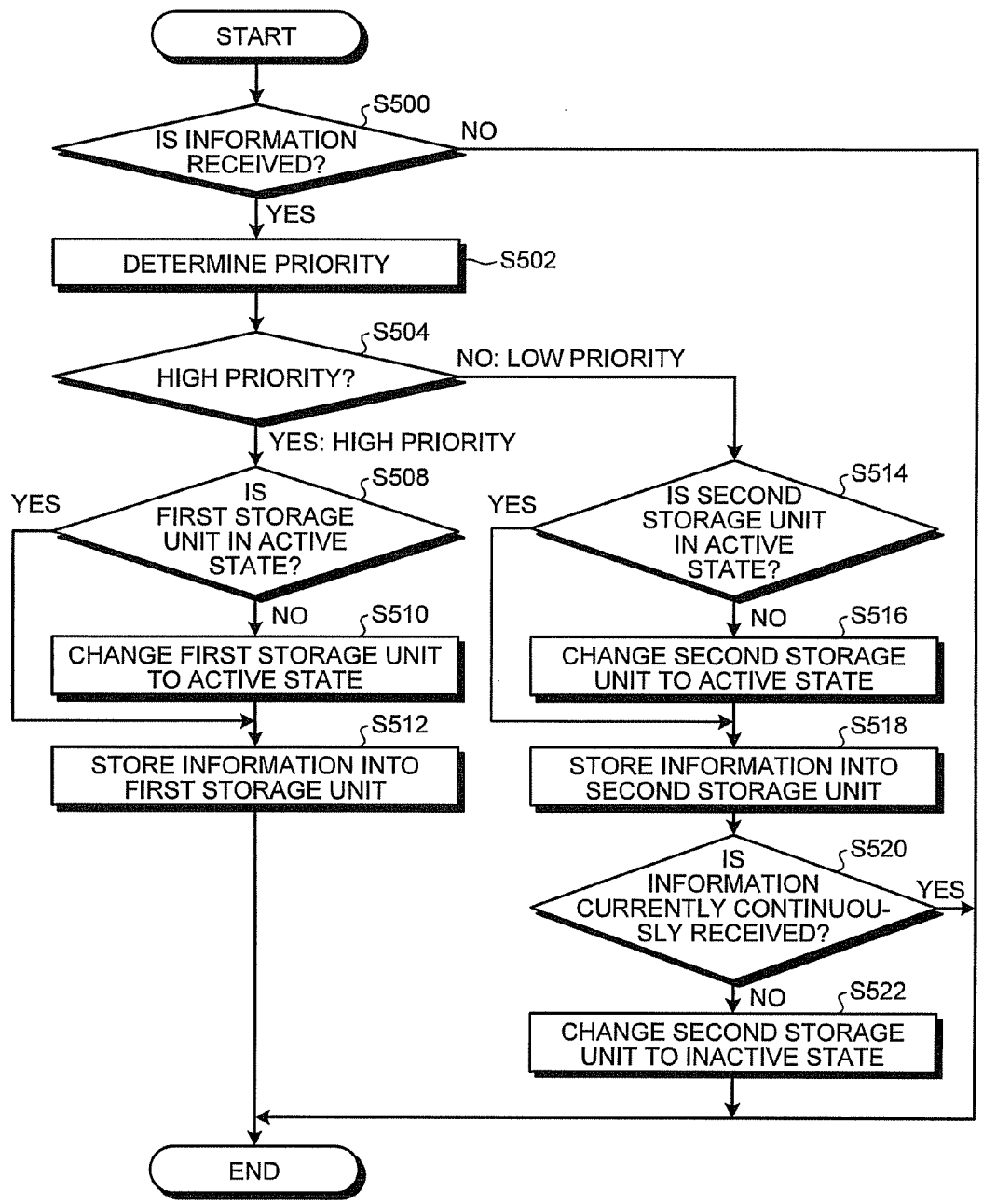
FIG. 8 is a flowchart illustrating a reception process according to the second embodiment.

FIG. 8 is a flowchart illustrating a procedure of a reception process in the transmission/reception process executed by the I/F unit 14A.

When receiving a notification at a predetermined time interval or receiving a notification from the host I/F 22 or from the NW I/F 24, the control unit 18A determines whether or not information is received from the host I/F 22 or the NW I/F 24 (step S500). When a negative determination is made in step S500 (step S500: No), the present routine is ended, and when a positive determination is made (step S500: Yes), the process proceeds to step S502.

Next, the control unit 18A determines the priority of the information accepted from the host I/F 22 or the NW I/F 24 (step S502). The priority is determined by the same manner as in the first embodiment. The control unit 18A determines whether or not the priority of the information determined in step S502 is a high priority that is the first priority set beforehand or higher (step S504). When the priority of the information determined in step S502 is the high priority, a positive determination is made (step S504: Yes), and then, the process proceeds to step S508.

Next, the control unit 18A determines whether or not the first storage unit 17A, corresponding to the high priority, out of the first storage unit 17A and the second storage unit 19A, is in the active state (step S508). For example, the control unit 18A stores state information indicating that the first storage unit 17A and the second storage unit 19A are in the active state or in the inactive state. The control unit 18A updates the state information to the state information indicating the controlled state, every time the control unit 18A controls the state of the first storage unit 17A or the second storage unit 19A. The control unit 18A may determine whether or not the first storage unit 17A is in the active state by reading the state information corresponding to the first storage unit 17A that is the destination to which the information is to be stored.

When the control unit 18A determines that the first storage unit 17A is not in the active state, i.e., in the inactive state (step S508: No), the process proceeds to step S510. In step S510, the control unit 18A changes the first storage unit 17A to the active state from the inactive state (step S510). Then, the process proceeds to step S512. On the other hand, when the control unit 18A determines that the first storage unit 17A is in the active state (step S508: Yes), the process proceeds to step S512.

In step S512, the control unit 18A stores the information, which is determined to have the high priority in step S502, into the first storage unit 17A (step S512). Then, this routine is ended.

On the other hand, when the priority of the information determined in step S502 is the low priority that is lower than the first priority, the negative determination is made in step S504 (step S504: No), and then, the process proceeds to step S514.

In step S514, the control unit 18A determines whether or not the second storage unit 19A, corresponding to the low priority, out of the first storage unit 17A and the second storage unit 19A, is in the active state in the manner same as that in step S508 (step S514).

When the control unit 18A determines that the second storage unit 19A is in the active state (step S514: Yes), the process proceeds to step S518. On the other hand, when the control unit 18A determines that the second storage unit 19A is in the inactive state (step S514: No), the process proceeds to step S516.

In step S516, the control unit 18A changes the second storage unit 19A to the active state from the inactive state (step S516). Then, the process proceeds to step S518.

In step S518, the control unit 18A stores the information, which is determined to have the low priority in step S502, into the second storage unit 19A (step S518).

Next, the control unit 18A determines whether or not information is currently continuously received from the host I/F 22 or from the NW I/F 24 in step S520 (step S520). When it is determined that information is currently continuously received (step S520: Yes), this routine is ended. The determination in step S520 is made in the same manner as in step S120 (see FIG. 3) in the first embodiment.

On the other hand, when it is determined that information is not currently continuously received, a negative determination is made (step S520: No). Then, the process proceeds to step S522. In step S522, the control unit 18A changes the second storage unit 19A to the inactive state from the active state (step S522), and then, ends this routine.

When the information accepted from the device control unit 12 has the high priority that is the first priority or higher priority, the I/F unit 14A allows the first storage unit 17A, which has higher power consumption in the non-access state, and which operates at a higher speed, compared to the second storage unit 19A, to become the active state, and then, stores this information into the first storage unit 17A by the execution of the processes in steps S500 to S522. When the information accepted from the device control unit 12 has the low priority that is lower than the first priority, the I/F unit 14A allows the second storage unit 19A, which has lower power consumption in the non-access state, and which operates at a lower speed, compared to the first storage unit 17A, to become the active state, and then, stores this information into the second storage unit 19A. When the information is not currently continuously received after the information is stored in the second storage unit 19A, the second storage unit 19A is changed to the inactive state.

Figure 9:
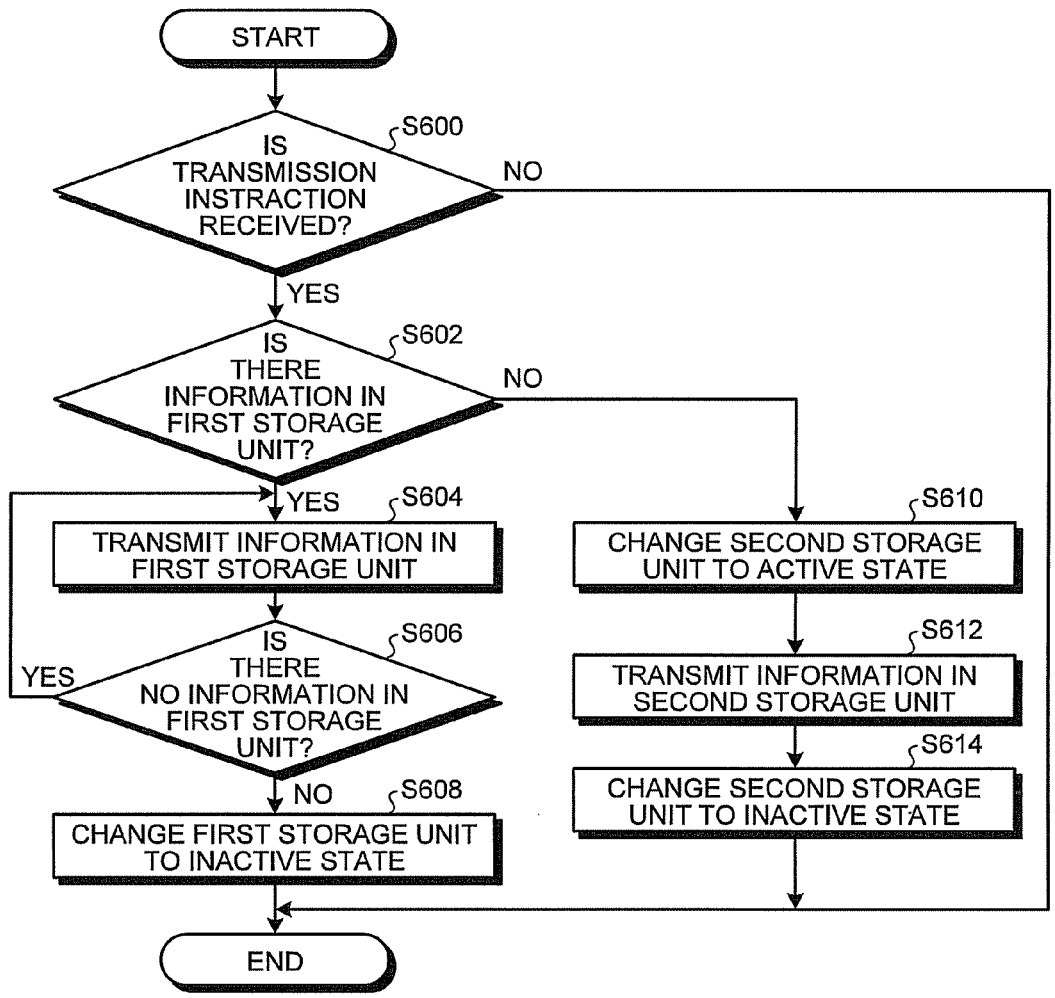
FIG. 9 is a flowchart illustrating a transmission process according to the second embodiment.

Subsequently, the transmission process in the transmission/reception process executed by the I/F unit 14A will be described. FIG. 9 is a flowchart illustrating a procedure of the transmission process executed by the I/F unit 14A.

The I/F unit 14A allows the transmission process illustrated in FIG. 9 to interrupt in the reception process in FIG. 8.

Firstly, the control unit 18A determines whether or not a transmission instruction is received from the device control unit 12 via the host I/F 22 or from the external device via the NW I/F 24 (step S600). When a negative determination is made in step S600 (step S600: No), this routine is ended. On the other hand, a positive determination is made in step S600 (step S600: Yes), the process proceeds to step S602.

Next, the control unit 18A determines whether there is the information in the first storage unit 17A that stores the information with the high priority. Specifically, the control unit 18A determines whether or not the information is stored in the first storage unit 17A (step S602). When the information is stored in the first storage unit 17A, a positive determination is made (step S602: Yes), and then, the process proceeds to step S604.

Then, the control unit 18A transmits the information stored in the first storage unit 17A (step S604). More specifically, the control unit 18A transmits the information read from the first storage unit 17A to the transmission destination that is included in the transmission instruction accepted in step S600 and that is indicated by the information indicating the transmission destination. Next, the control unit 18A determines whether there is no information in the first storage unit 17A (step S606). When a positive determination is made (step S606: Yes), the process returns to step S604. Specifically, the control unit 18A determines in step S606 whether or not all processes to the information stored in the first storage unit 17A are completed. On the other hand, when the control unit 18A determines that there is no information in the first storage unit 17A (step S606: No), the process proceeds to step S608.

In step S608, the control unit 18A changes the first storage unit 17A to the inactive state from the active state (step S608). Then, this routine is ended.

On the other hand, when a negative determination is made in step S602 (step S602: No), i.e., when there is no information in the first storage unit 17A, the process proceeds to step S610. In step S610, the control unit 18A changes the second storage unit 19A to the active state from the inactive state (step S610).

Next, the control unit 18A reads the information from the second storage unit 19A and transmits this information (step S612). The transmission destination of the information is the same as that in step S604.

Then, the control unit 18A changes the second storage unit 19A to the inactive state (step S614), and then, ends this routine.

As described above, in the information processing device 10A according to the second embodiment, the control unit 18A determines the priority of the information that is the subject to be stored, and stores the information into the first storage unit 17A or the second storage unit 19A based on the determined priority. Accordingly, the control unit 18A can store the information to be stored in plural types of storage units, each having different power consumption, according to the priority, thereby being capable of realizing power-saving of the information processing device 10A and a performance retention of the information processing device 10A.

In the information processing device 10A according to the second embodiment, the above-mentioned transmission/reception process is executed by the control unit 18A, the first storage unit 17A, and the second storage unit 19A. Therefore, various processes that are executed by hardware in the information processing device 10 according to the first embodiment can be realized by software operating on the control unit 18A. Accordingly, the information processing device 10A according to the second embodiment can reduce cost for the components due to the reduction in the number of the components, can reduce a mounting area, and can enhance flexibility, in addition to the effects obtained by the information processing device 10 according to the first embodiment.

Third Embodiment

In a third embodiment, the control unit for controlling the I/F unit is also changed to the active state or to the inactive state.

Figure 10:
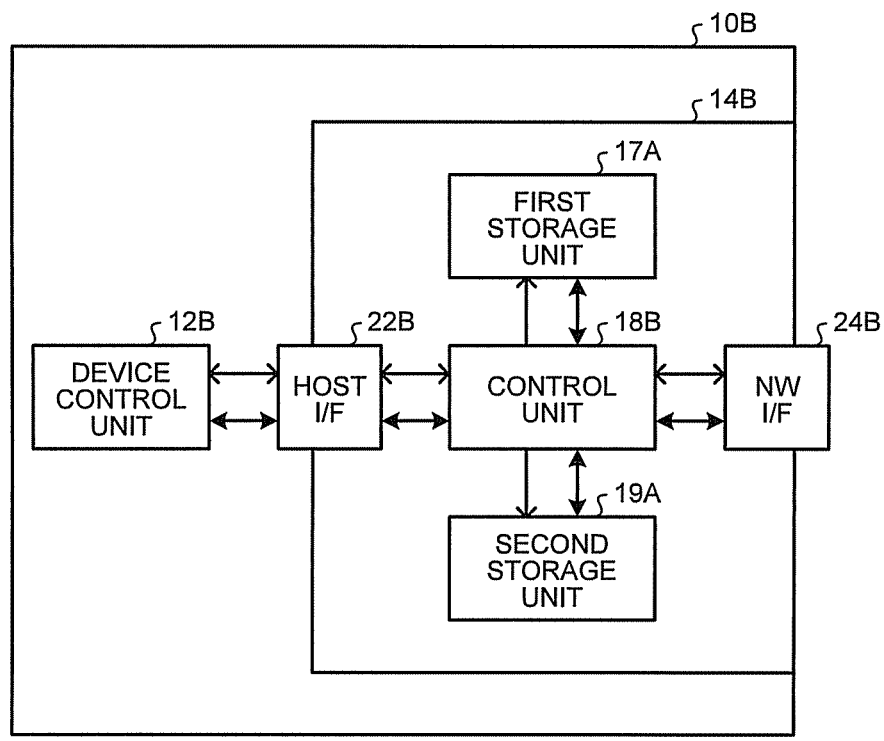
FIG. 10 is a diagram illustrating an information processing device according to a third embodiment.

FIG. 10 is a block diagram illustrating a functional configuration of an information processing device 10B according to the third embodiment.

The information processing device 10B includes a device control unit 12B, and an I/F unit 14B.

The device control unit 12B transmits information transmitted to the external device to the I/F unit 14B, like the device control unit 12 in the first embodiment and the second embodiment. The device control unit 12B also receives information from the external device via the I/F unit 14B, like the device control unit 12.

The device control unit 12B also outputs a state instruction signal for changing a control unit 18B to the active state or to the inactive state to the I/F unit 14B.

The I/F unit 14B includes a host I/F 22B, an NW I/F 24B, the first storage unit 17A, the control unit 18B, and the second storage unit 19A. The first storage unit 17A and the second storage unit 19A are the same as those in the second embodiment.

The host I/F 22B accepts the information, which is to be transmitted to the external device, from the device control unit 12B. The host I/F 22B also accepts the state instruction signal for changing the control unit 18B to the active state or to the inactive state from the device control unit 12B.

The NW I/F 24B accepts the information, which is to be transmitted to the device control unit 12B, from the external device. The NW I/F 24B also accepts the state instruction signal for changing the control unit 18B to the active state or to the inactive state from the external device.

The control unit 18B is a computer configured by including a CPU, a ROM, and a RAM, and controls the whole I/F unit 14B. Specifically, the control unit 18B controls to normally execute the transmission/reception process performed through the host I/F 22B and the NW I/F 24B, like the control unit 18A in the second embodiment. The control unit 18B determines the priority of the information accepted from the host I/F 22B or the NW I/F 24B, like the control unit 18A in the second embodiment. The control unit 18B controls such that the information whose determined priority is high such as a first priority or higher priority is stored in the first storage unit 17A, while the information whose determined priority is low such as a priority lower than the first priority is stored in the second storage unit 19A. Specifically, the control unit 18B executes the transmission/reception process same as that executed by the control unit 18A in the second embodiment.

The control unit 18B in the third embodiment has a function of executing a state change process, in addition to the function of executing the transmission/reception process. Specifically, the control unit 18B is changed to a state indicated by the state instruction signal accepted from the host I/F 22B or the NW I/F 24B. More specifically, when accepting the state instruction signal indicating the active state from the host I/F 228 or the NW I/F 24B, the control unit 18B is changed to the active state. On the other hand, when accepting the state instruction signal indicating the inactive state from the host I/F 22B or the NW I/F 24B, the control unit 18B is changed to the inactive state.

Subsequently, a procedure of the state change process executed by the control unit 18B will be described. The control unit 18B executes the transmission/reception process executed by the control unit 18A in the second embodiment. The control unit 18B executes the state change process as an interruption routine to the transmission/reception process.

Figure 11:
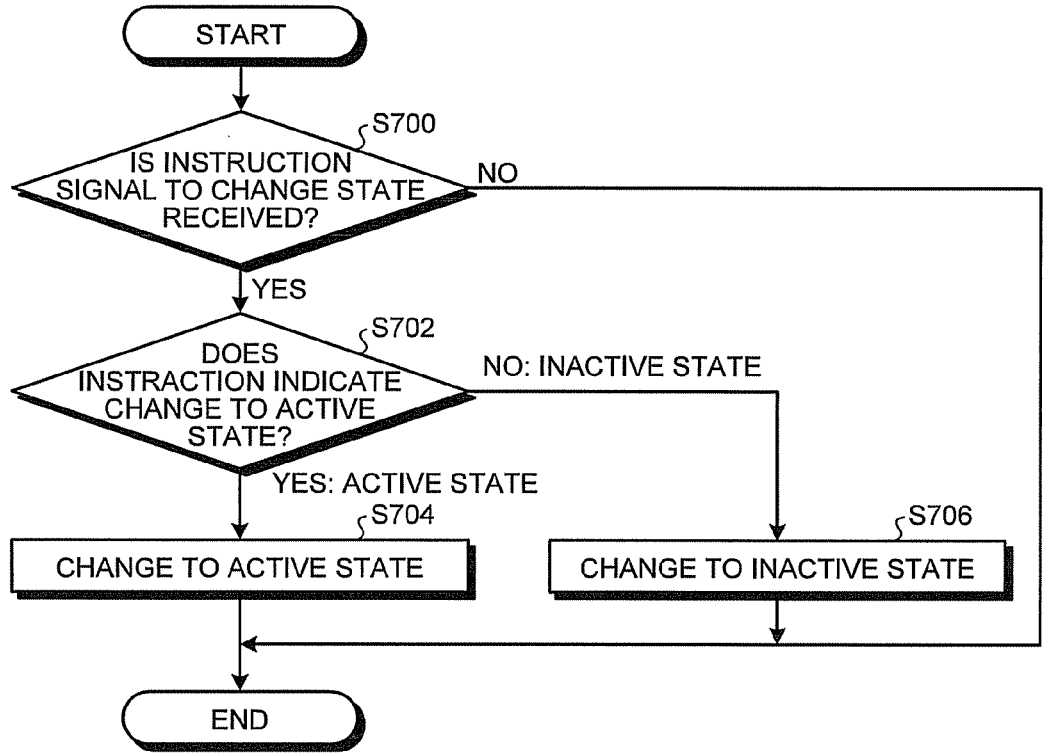
FIG. 11 is a flowchart illustrating a state change process according to the third embodiment.

FIG. 11 is a flowchart illustrating the procedure of the state change process executed by the control unit 18B.

Firstly, the control unit 18B determines whether or not a state change instruction signal is received from the host I/F 22B or from the NW I/F 24B (step S700). When a negative determination is made in step S700 (step S700: No), this routine is ended. On the other hand, a positive determination is made in step S700 (step S700: Yes), the process proceeds to step S702.

In step S702, the control unit 18B determines whether or not the state change instruction signal accepted in step S700 is an instruction signal for instructing the active state (step S702). When a positive determination is made in step S702, which means the accepted state change instruction signal is the state change instruction to the active state (step S702: Yes), the process proceeds to step S704. The control unit 18B is changed to the active state (step S704), and then, ends this routine.

Specifically, the control unit 18B is changed to the active state that accepts various signals including the state change instruction signal and various information from the inactive state that accepts the state change instruction signal from the host I/F 22B and the NW I/F 24B but does not accept various information and various signals excluding the state change instruction signal.

On the other hand, when a negative determination is made in step S702, which means the accepted state change instruction signal is the state change instruction to the inactive state (step S702: No), the process proceeds to step S706. The control unit 18B is changed to the inactive state (step S706), and then, ends this routine.

Specifically, the control unit 18B is changed to the inactive state that accepts the state change instruction signal from the host I/F 22B and the NW I/F 24B but does not accept various information and various signals excluding the state change instruction signal from the active state that accepts various signals including the state change instruction signal and various information.

Like the control unit 18A in the second embodiment, the control unit 18B executes the transmission/reception process. It is supposed that, before executing the transmission/reception process, the control unit 18B receives the state change instruction signal, indicating the change to the active state, from the device control unit 12B or the external device. Specifically, the control unit 18B executes the transmission/reception process (see FIGS. 8 and 9) in the same manner as the control unit 18A, after being changed to the active state.

Figure 12:
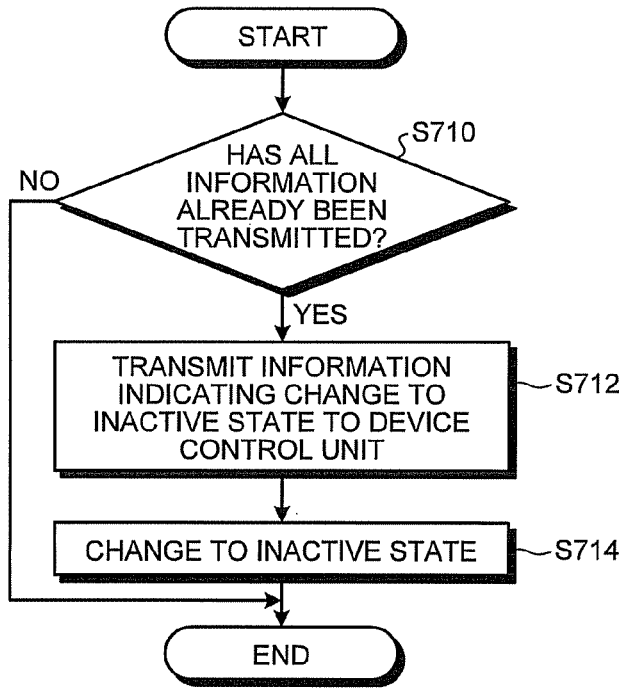
FIG. 12 is a flowchart illustrating an interruption process according to the third embodiment.

The control unit 18B may execute the interruption process illustrated in FIG. 12 at a predetermined time interval. FIG. 12 is a flowchart illustrating a procedure of the interruption process executed by the control unit 18B.

The control unit 18B determines whether or not all information stored in the first storage unit 17A and the second storage unit 19A has already been transmitted at a predetermined time interval (step S710). When a negative determination is made in step S710 (step S710: No), this routine is ended. When a positive determination is made (step S710: Yes), the process proceeds to step S712.

In step S712, the control unit 18B transmits the information, indicating that the control unit 18B is changed to the inactive state, to the device control unit 12B via the host I/F 22B (step S712). Then, the control unit 18B is changed to the inactive state (step S714), and then, ends this routine.

In the third embodiment, the control unit 18B is changed to the active state or to the inactive state based on the received state change instruction signal. After the control unit 18B is changed to the active state, the control unit 18B executes the transmission/reception process for changing the state of each unit (the first storage unit 17A, the second storage unit 19A). However, the states of the first storage unit 17A and the second storage unit 19A may be changed by the control of the host I/F 22B or the NW I/F 24B.

As described above, the information processing device 10B according to the third embodiment has a function that is an extended function of the information processing device 10A in the second embodiment. Specifically, in the information processing device 10B, the control unit 18B is also changed to the active state or to the inactive state.

Therefore, the information processing device 10B according to the third embodiment can reduce power consumption more, in addition to the effects obtained by the first embodiment and the second embodiment.

Fourth Embodiment

The first to third embodiments describe the configuration in which the storage units, each having different power consumption, are applied as a temporary storage region formed in the I/F unit (I/F unit 14, I/F unit 14A, I/F unit 14B). A fourth embodiment describes a configuration in which the storage units, each having different power consumption, are provided as a storage region in the main body of the information processing device.

Figure 13:
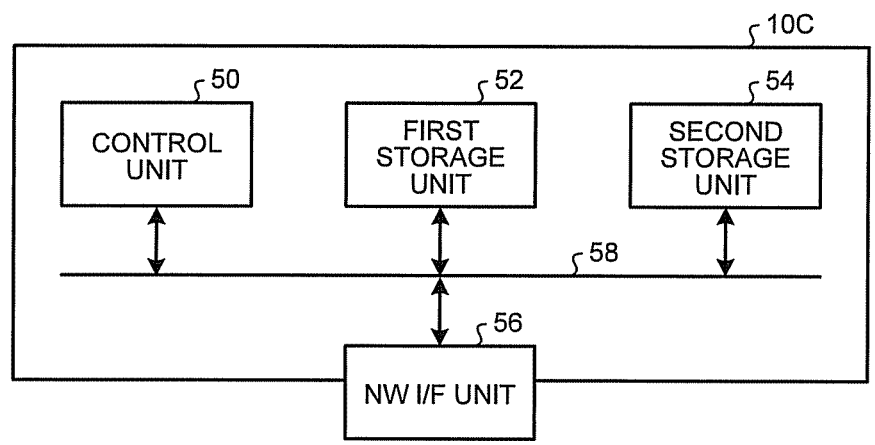
FIG. 13 is a diagram illustrating an information processing device according to a fourth embodiment.

FIG. 13 is a block diagram illustrating a functional configuration of an information processing device 10C in the fourth embodiment. In the fourth embodiment, the information processing device 10C functions as a communication apparatus. As illustrated in FIG. 13, the information processing device 10C according to the fourth embodiment includes a control unit 50, a first storage unit 52, a second storage unit 54, and a network interface unit 56 (hereinafter referred to as an NW I/F unit 56).

The control unit 50, the first storage unit 52, the second storage unit 54, and the NW I/F unit 56 are connected with a bus 58.

The control unit 50 controls the whole information processing device 10C. The control unit 50 is a computer configured by including a CPU, a ROM, and a RAM, and controls the whole information processing device 10C. The transmission/reception program described in the first to third embodiments, other various programs, an operating system (OS), and various applications operate on the information processing device 10C.

The NW I/F unit 56 connects the information processing device 10C and network. The NW I/F unit 56 may use an interface or communication system same as the NW I/F 24 described in the first embodiment.

The first storage unit 52 and the second storage unit 54 store various pieces of information. The relationship between the first storage unit 52 and the second storage unit 54 and their functions are the same as the relationship between the first storage unit 26 and the second storage unit 28 and their functions, and the relationship between the first storage unit 30 and the second storage unit 32, and their functions described in the first embodiment.

Specifically, the power consumption of the first storage unit 52 and the power consumption of the second storage unit 54 are different from each other. The power consumption of the second storage unit 54 in the non-access state is lower than the power consumption of the first storage unit 52 in the non-access state. The first storage unit 52 operates at a higher speed than the second storage unit 54. The first storage unit 52 and the second storage unit 54 are controlled to be in two types of states, which are an active state and an inactive state.

The information processing device 10C may have a configuration of including known peripheral devices (not illustrated) such as a disk drive or display adapter. The control unit 50 and the first and second storage units 52 and 54 may be electrically connected to each other to form the information processing device 10C serving as a communication device, and the bus 58 may be an internal bus of the control unit 50 or may be an external bus.

It is supposed that software utilizing network (hereinafter referred to as network software) operates on the control unit 50 as one of software. The control unit 50 stores information generated by the software of the control unit 50, and the information received via the NW I/F unit 56 into the first storage unit 52 or the second storage unit 54 according to the priority of the information. The information stored in the first storage unit 52 and the second storage unit 54 is transmitted to the network through the NW I/F unit 56, or processed by the control unit 50.

Figure 14:
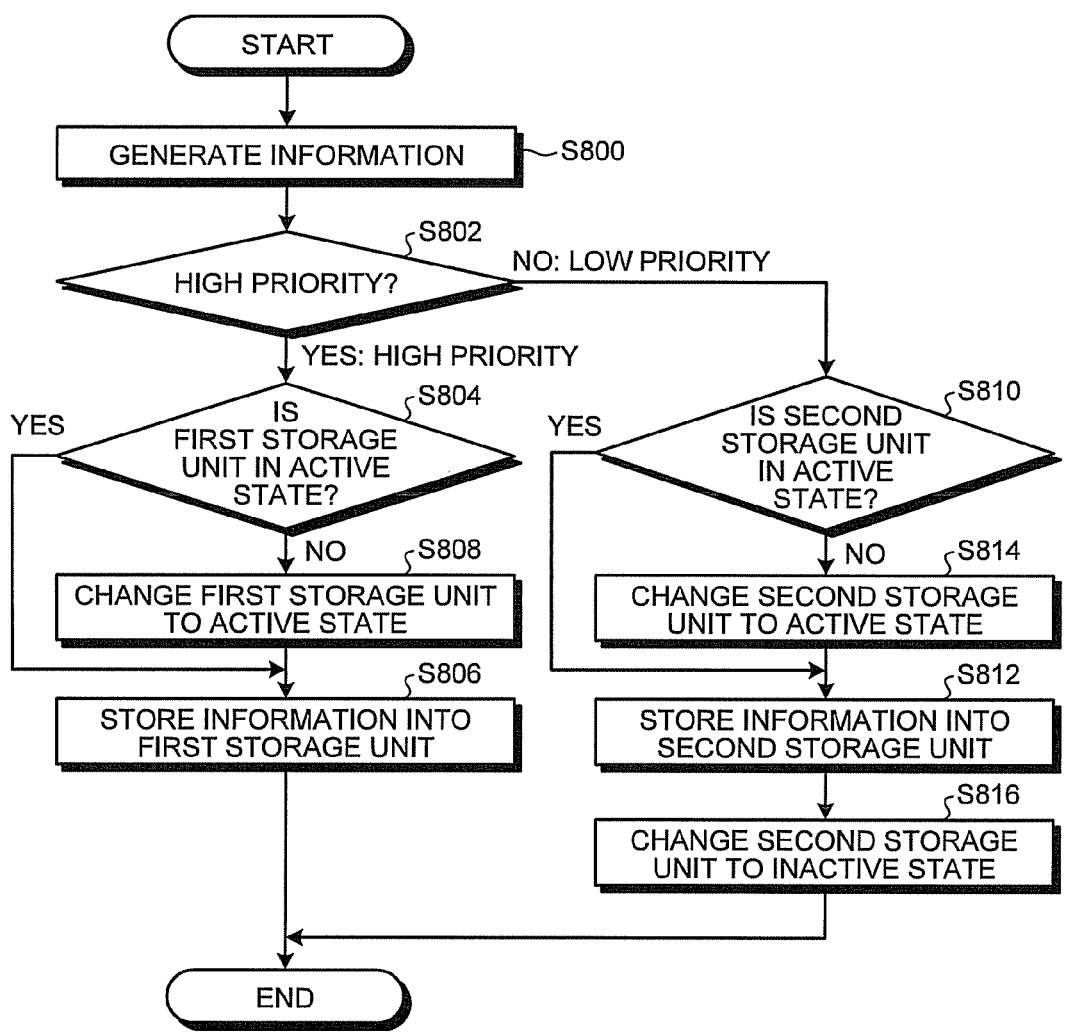
FIG. 14 is a flowchart illustrating an information storage process according to the fourth embodiment.

Subsequently, the transmission/reception process executed by the control unit 50 will be described. FIG. 14 is a flowchart illustrating a procedure of an information storage process in the transmission/reception process executed by the control unit 50.

Firstly, the control unit 50 generates information (step S800). The priority of the information generated by the control unit 50 agrees with the priority assigned to the software such as an application. The priority may be assigned to the software by a user, or by an application developer. Alternatively, the priority may automatically be determined by an OS (foreground or background).

Next, the control unit 50 determines whether or not the generated information has a high priority that is the first priority or higher priority (step S802). When the information has the high priority, a positive determination is made (step S802: Yes), and then, the process proceeds to step S804.

Next, the control unit 50 determines whether or not the first storage unit 52, corresponding to the high priority, out of the first storage unit 52 and the second storage unit 54, is in the active state (step S804). For example, the control unit 50 stores state information indicating that the first storage unit 52 and the second storage unit 54 are in the active state or in the inactive state. The control unit 50 updates the state information to the state information indicating the controlled state, every time the control unit 50 controls the state of the first storage unit 52 or the second storage unit 54. The control unit 50 may determine whether or not the first storage unit 52 is in the active state by reading the state information corresponding to the first storage unit 52 that is the subject to which the information is to be stored.

When determining that the first storage unit 52 is in the active state (step S804: Yes), the control unit 50 proceeds to step S806. On the other hand, when determining that the first storage unit 52 is not in the active state, i.e., in the inactive state (step S804: No), the control unit 50 proceeds to step S808.

In step S808, the control unit 50 changes the first storage unit 52 to the active state from the inactive state (step S808). Then, the control unit 50 proceeds to step S806.

In step S806, the control unit 50 assigns a memory area from the first storage unit 52 in order to store the information having the high priority generated in step S800. With this process, the information with the high priority is stored in the first storage unit 52 (step S806). Then, this routine is ended.

The assignment of the memory area means that the correspondence relationship between a physical address of the storage unit (the first storage unit 52 or the second storage unit 54) to which the information is to be stored and an address managed by the network software is established. For example, in the case of an OS using, a virtual memory, the correspondence relationship between the address of the physical memory and the address of a virtual memory used by the application is managed by the OS as a page table. When an entry is created in this table, the address of the first storage unit 52 is associated with a certain virtual address, and the address of the second storage unit 54 is associated with a certain virtual address. When the storage unit (the first storage unit 52 or the second storage unit 54) is changed during the process, the physical address in the entry may be changed. In this case, a copying process has to be executed in order to ensure consistency with the content stored in the virtual memory.

On the other hand, when the priority of the generated information is the low priority that is lower than the first priority, the negative determination is made in step S802 (step S802: No), and then, the control unit 50 proceeds to step S810.

Next, the control unit 50 determines whether or not the second storage unit 54 to which the information with the low priority is to be stored is in the active state in the manner same as that in step S804 (step S810).

When the control unit 50 determines that the second storage unit 54 is in the active state (step S810: Yes), the control unit 50 proceeds to step S812 described later. On the other hand, when the control unit 50 determines that the second storage unit 54 is in the inactive state (step S810: No), the control unit 50 changes the second storage unit 54 to the active state from the inactive state (step S814), and then, proceeds to step S812.

In step S812, the control unit 50 assigns a memory area from the second storage unit 54 in order to store the information having the low priority generated in step S800. With this process, the information with the low priority is stored in the second storage unit 54 (step S812). Thereafter, the control unit 50 changes the second storage unit 54 to the inactive state from the active state (step S816), and then, ends this routine.

Figure 15:
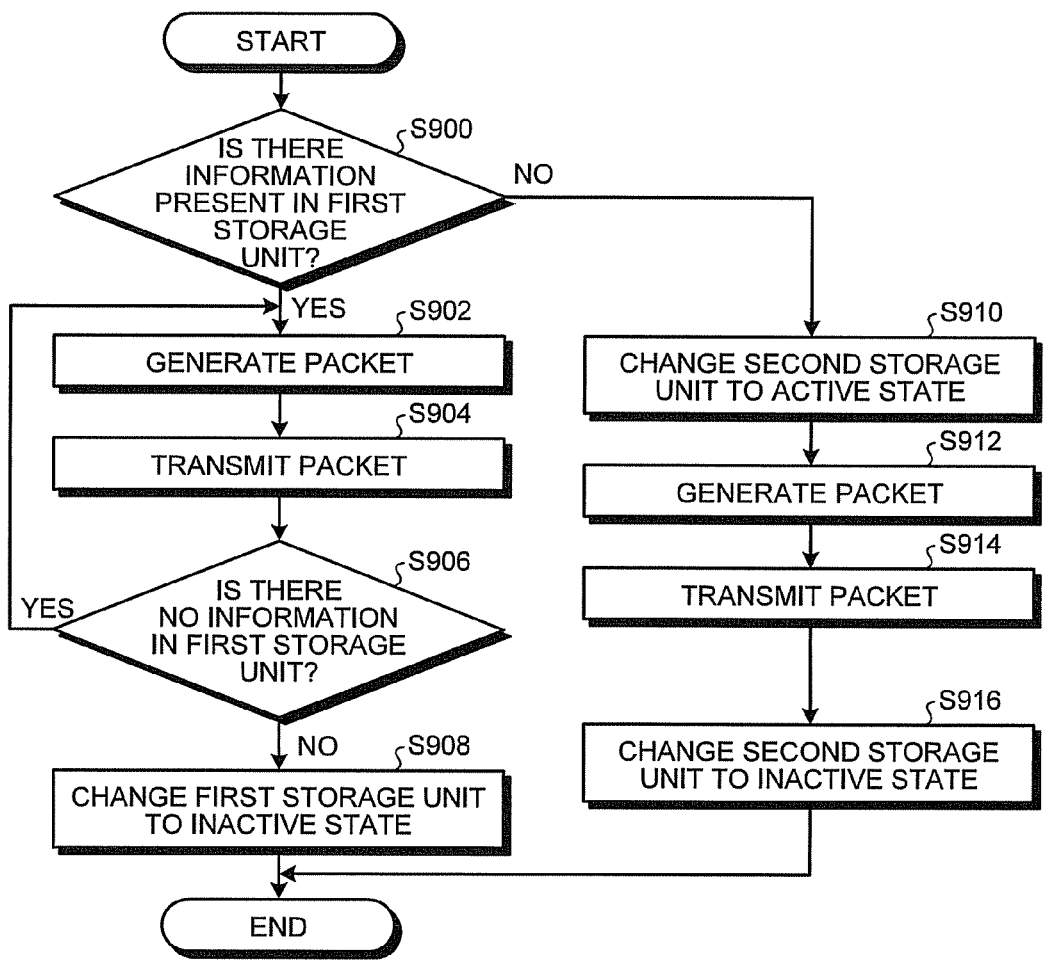
FIG. 15 is a flowchart illustrating a transmission process according to the fourth embodiment.

Subsequently, a transmission process in the transmission/reception process executed by the control unit 50 will be described. FIG. 15 is a flowchart illustrating a procedure of the transmission process executed by the control unit 50.

Firstly, the control unit 50 determines whether or not there is information in the first storage unit 52 that stores information with the high priority, i.e., whether or not there is information assigned to the first storage unit 52 (step S900). When information is assigned to the first storage unit 52, the control unit 50 makes a positive determination (step S900: Yes), and then, proceeds to step S902.

Next, the control unit 50 shapes the information assigned to the first storage unit 52 into a form by which the information can be transmitted to the network, and applies a header to form a packet (step S902). Then, the control unit 50 transmits the generated packet via the NW I/F unit 56 (step S904).

Next, the control unit 50 determines whether there is no information assigned to the first storage unit 52 (step S906). Specifically, the control unit 50 determines in step S906 whether or not all processes to the information stored in the first storage unit 52 are completed. When there is the information assigned to the first storage unit 52, the control unit 50 makes a positive determination (step S906: Yes), and then, returns to step S902. On the other hand, when there is no information assigned to the first storage unit 52, the control unit 50 makes a negative determination (step S906: No), and then, proceeds to step S908.

Next, the control unit 50 changes the first storage unit 52 to the inactive state from the active state (step S908), and then, ends this routine.

On the other hand, when the control unit 50 makes the negative determination in step S900 (step S900: No), which means there is no information assigned to the second storage unit 54, it proceeds to step S910. Then, the control unit 50 changes the second storage unit 54 to the active state from the inactive state (step S910).

Next, the control unit 50 transforms the information assigned to the second storage unit 54 into a form by which the information can be transmitted to the network, and applies a header to form a packet (step S912). Then, the control unit 50 transmits the generated packet via the NW I/F unit 56 (step S914).

Next, the control unit 50 changes the second storage unit 54 to the inactive state from the active state (step S916), and then, ends this routine.

In the fourth embodiment, it has been described that the information is assigned to the first storage unit 52 or the second storage unit 54 according to the priority of the generated information. However, it is highly possible that the control unit 50 frequently refers to even information with the low priority in the process before the information is transmitted to the network. In order to cope with this situation, even the information with the low priority may be stored in the first storage unit 52 before a packet is generated (see step S912), and may be moved to the second storage unit 54 just before it is transmitted to the NW I/F unit 56.

In the transmission/reception process, when the first storage unit 52 is used, the control unit 50 keeps the first storage unit 52 in the active state even if the information that is to be stored is stored or the information is referred to. On the other hand, when the second storage unit 54 is used, the control unit 50 changes the second storage unit 54 to the inactive state from the active state, in principle, after the information that is to be stored is stored or the information is referred to. When the control unit 50 determines that the second storage unit 54 is continuously used, the control unit 50 may keep the second storage unit 54 in the active state even after the information that is to be stored is stored or the information is referred to.

Figure 16:
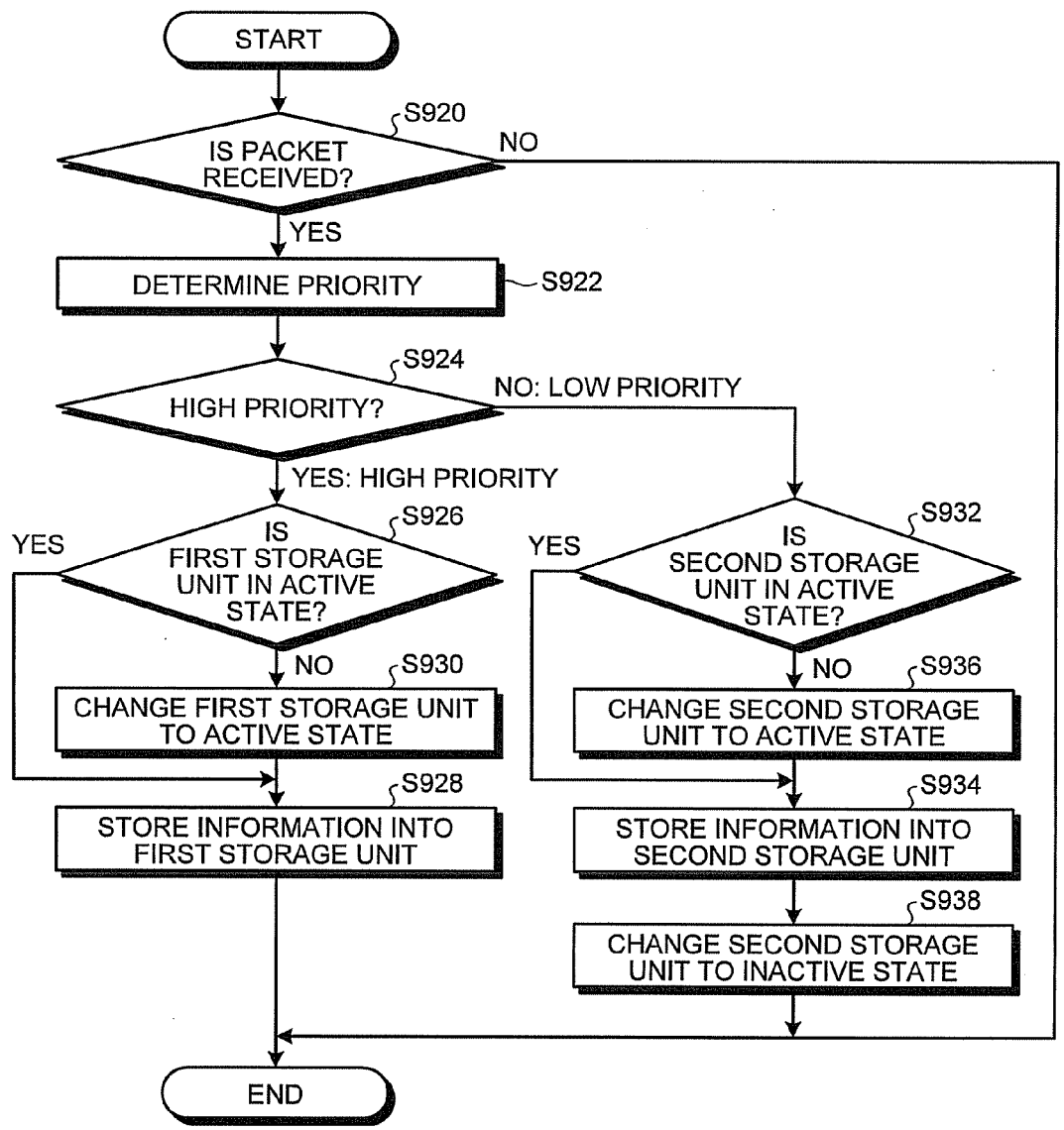
FIG. 16 is a flowchart illustrating a reception process according to the fourth embodiment.

A reception process in the transmission/reception process executed by the information processing device 10C will subsequently be described. FIG. 16 is a flowchart illustrating a procedure of the reception process in the transmission/reception process executed by the information processing device 10C.

Firstly, the NW I/F unit 56 determines whether or not a packet is received from the external device via the network at a predetermined time interval (step S920). When a negative determination is made in step S920 (step S920: No), this routine is ended, and when a positive determination is made (step S920: Yes), the process proceeds to step S922.

Next, the NW I/F unit 56 determines priority of information included in the accepted packet (step S922). The priority is determined in the same manner as that in the first embodiment. Next, the control unit 50 determines whether or not the priority of the information determined in step S922 is a high priority that is the first priority or higher priority (step S924). When the priority of the information is the high priority, a positive determination is made (step S924: Yes), and then, the process proceeds to step S926.

Next, the control unit 50 determines whether or not the first storage unit 52, corresponding to the high priority, out of the first storage unit 52 and the second storage unit 54, is in the active state (step S926). When the control unit 50 determines that the first storage unit 52 is not in the active state, i.e., in the inactive state (step S926: No), the process proceeds to step S930. In step S930, the control unit 50 changes the first storage unit 52 to the active state from the inactive state (step S930). Then, the process proceeds to step S928. On the other hand, when the control unit 50 determines that the first storage unit 52 is in the active state (step S926: Yes), the process proceeds to step S928.

In step S928, the control unit 50 stores the information, which is determined to have the high priority in step S922, into the first storage unit 52 (step S928). Then, this routine is ended.

On the other hand, when the priority of the information is the low priority that is lower than the first priority, a negative determination is made in step S924 (step S924: No), and then, the process proceeds to step S932.

In step S932, the control unit 50 determines whether or not the second storage unit 54, corresponding to the low priority, out of the first storage unit 52 and the second storage unit 54, is in the active state (step S932).

When the control unit 50 determines that the second storage unit 54 is in the active state (step S932: Yes), the process proceeds to step S934. On the other hand, when the control unit 50 determines that the second storage unit 54 is in the inactive state (step S932: No), the process proceeds to step S936.

In step S936, the control unit 50 changes the second storage unit 54 to the active state from the inactive state (step S936). Then, the process proceeds to step S934.

In step S934, the control unit 50 stores the information, which is determined to have the low priority in step S922, into the second storage unit 54 (step S934).

Next, in step S938, the control unit 50 changes the second storage unit 54 to the inactive state from the active state (step S938), and then, this routine is ended.

As described above, the information processing device 10C according to the fourth embodiment selects the storage unit (the first storage unit 52, the second storage unit 54) in the information processing device 10C based on the priority of the information generated by the network software of the control unit 50, and stores this information into the selected storage unit.

Therefore, in the information processing device 10C according to the fourth embodiment, further power-saving of the information processing device 10C and further performance retention of the information processing device 10C can both be realized.

In the above description, the NW I/F unit 56 makes the determination of the priority (see step S922). However, the control unit 50 may determine the priority of the information included in the packet accepted from the external device.

When the control unit 50 determines the priority, a method described below may be employed.

For example, there is a method (hereinafter referred to as Method 1) in which the control unit 50 temporarily stores the accepted packet into the first storage unit 52 in order to determine the priority of the information included in the packet. There is also a method (hereinafter referred to as Method 2) in which the control unit 50 temporarily stores the accepted packet into the second storage unit 54 in order to determine the priority of the information included in the packet. There is also a method (hereinafter referred to as Method 3) in which the control unit 50 temporarily stores the accepted packet into the storage unit (the first storage unit 52 or the second storage unit 54) corresponding to the priority that is more frequently determined based on the determination result in the past, in order to determine the priority of the information included in the packet. There is also a method (hereinafter referred to as Method 4) in which the control unit 50 uses the same storage unit (the first storage unit 52 or the second storage unit 54) as that used for the last determination in order to determine the priority of the information included in the packet. There is also a method (hereinafter referred to as Method 5) in which the control unit 50 temporarily stores the accepted packet into both the first storage unit 52 and the second storage unit 54, and determines the priority of the information included in the packet stored in either one of the first storage unit 52 and the second storage unit 54.

Even in any of determination methods including Methods 1 to 5, the control unit 50 rearranges the information into the storage unit (the first storage unit 52 or the second storage unit 54) based on the determined priority from the storage unit (the first storage unit 52 or the second storage unit 54) temporarily storing the information for determining the priority.

When Method 3 or Method 4 is used as the determination method of the priority, previous determination information is managed by the control unit 50, and the storage destination is instructed to the NW I/F unit 56, whereby the storage destination can be specified.

Fifth Embodiment

In the first to fourth embodiments, the case where the information processing device 10, the information processing device 10A, the information processing device 10B, and the information processing device 10C are applied to an apparatus connected to network is described.

However, the information processing device 10, the information processing device 10A, the information processing device 10B, and the information processing device 10C can be realized as a relay device such as a router, or a wireless LAN access point. Specifically, it may be configured that these information processing devices (the information processing device 10, the information processing device 10A, the information processing device 10B, and the information processing device 10C) are electrically connected through the device control unit.

Figure 17:
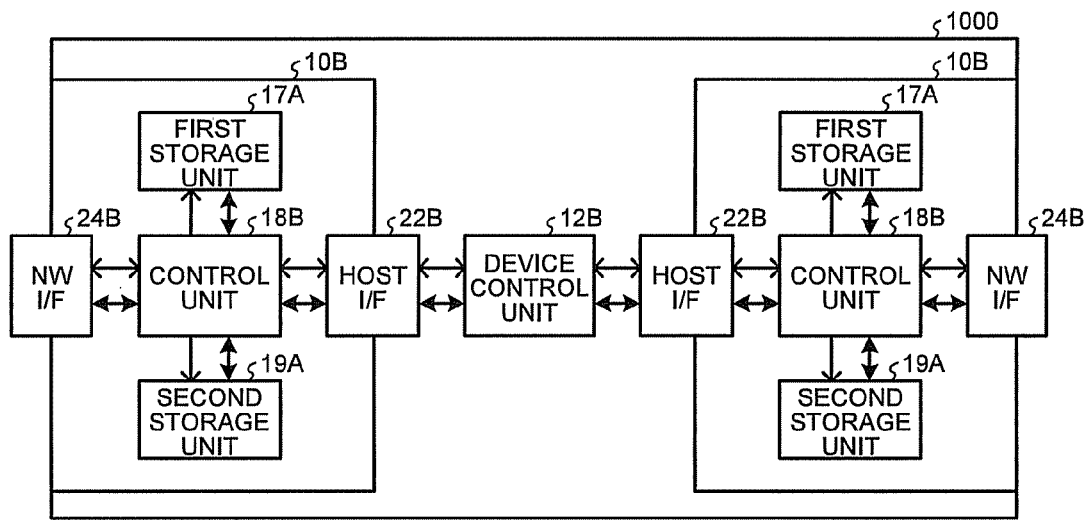
FIG. 17 is a diagram illustrating a relay device according to a fifth embodiment.

FIG. 17 is a schematic view illustrating one example of a relay device 1000. The relay device 1000 is configured such that two information processing devices 10B are electrically connected to the device control unit 12B via the host I/F 22B of each of the information processing devices 10B. According to the relay device 1000 configured such that two information processing devices 10B are electrically connected to the device control unit 12B via the host I/F 22B of each of the information processing devices 10B, packets can be transferred between the NW I/F 24B.

Figure 18:
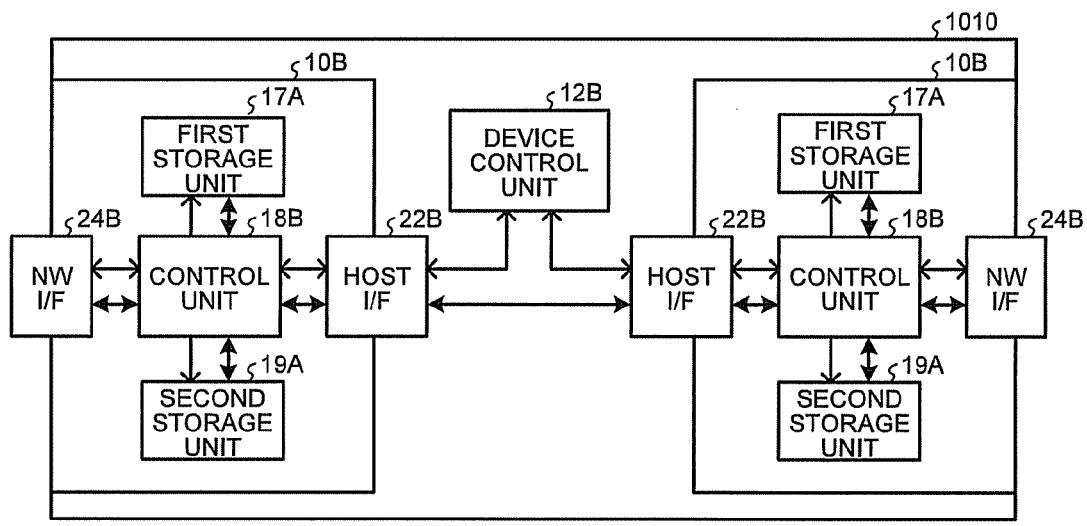
FIG. 18 is a diagram illustrating another example of the relay device according to the fifth embodiment.

In the relay device 1000 illustrated in FIG. 17, the device control unit 12B relays two NW I/F 24B. However, it may be configured such that data may directly be transferred between two NW I/F 24B. FIG. 18 is a schematic view illustrating one example of a relay device 1010. The relay device 1010 is configured such that data is directly transferred between the host I/Fs 22B of the two information processing devices 10B. The device control unit 12B transmits various instruction information to the control unit 18B via the host I/F 22B.

FIGS. 17 and 18 illustrate the case where the data is transferred between two NW I/F 24B. However, data may be transferred among three or more NW I/F 24B.

A program for executing each of the transmission/reception processes executed in each of the information processing device 10, the information processing device 10A, the information processing device 10B, and the information processing device 10C in the first to fifth embodiments is provided as being installed beforehand to a ROM or the like.

The program for executing each of the transmission/reception processes executed in each of the information processing device 10, the information processing device 10A, the information processing device 10B, and the information processing device 10C in the first to fifth embodiments may be provided as being recorded on a computer-readable recording medium, such as CD-ROM, flexible disk (FD), CD-R, or digital versatile disk (DVD), in an installable form or executable form file.

The program for executing each of the transmission/reception processes executed in each of the information processing device 10, the information processing device 10A, the information processing device 10B, and the information processing device 10C in the first to fifth embodiments may be stored on a computer connected to network such as the Internet, and provided as being downloaded through the network. The program for executing each of the transmission/reception processes executed in each of the information processing device 10, the information processing device 10A, the information processing device 10B, and the information processing device 10C in the first to fifth embodiments may also be provided or distributed through the network such as the Internet.

The program for executing each of the transmission/reception processes executed in each of the information processing device 10, the information processing device 10A, the information processing device 10B, and the information processing device 10C in the first to fifth embodiments has a module structure. As an actual hardware, a CPU (processor) reads the program from the ROM and executes the program, whereby the respective units are loaded on a main memory, and the respective function units are formed on the main memory.

It has been described that the respective storage units (the first storage unit 17A, the second storage unit 19A, the first storage unit 26, the second storage unit 28, the first storage unit 30, the second storage unit 32) in the information processing device 10, the information processing device 10A, the information processing device 10B, and the information processing device 10C in the first to fifth embodiments are controlled by the control unit 18, the control unit 18A, and the control unit 18B. Actually, various components (power source control IC, or the like) for controlling a voltage of a power source that supplies electric power to the respective units might be needed, in addition to the control unit 18, the control unit 18A, and the control unit 18B. Even if these components are mounted, the scope of the present embodiments can be applied without deteriorating the essence of the embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a first storage unit;
a second storage unit having power consumption different from that of the first storage unit; and
a control unit configured to perform control to determine a priority of information that is to be stored in the first storage unit or the second storage unit, and to store the information into the first storage unit or into the second storage unit based on the determined priority, wherein
the second storage unit has power consumption in a non-access state lower than the power consumption of the first storage unit in a non-access state, and
the control unit performs control to store the information having a predetermined first priority or higher into the first storage unit and performs control to store the information having a lower priority than the first priority into the second storage unit.

2. The device according to claim 1, wherein
the first storage unit is a volatile memory, and
the second storage unit is a non-volatile memory.

3. The device according to claim 1, wherein
the control unit includes a determination unit configured to determine the priority based on a reference frequency of the information so that the higher the reference frequency of the information, the higher the priority.

4. The device according to claim 1, wherein
the control unit includes a determination unit configured to determine the priority based on a degree of importance so that the lower a degree of importance of the information, the higher the priority.

5. The device according to claim 1, wherein
the control unit includes a state control unit configured to control a state of each of the first storage unit and the second storage unit, wherein
after performing control to change the second storage unit to an active state from an inactive state, the state control unit performs control to store the information into the second storage unit, and after performing control to store the information into the second storage unit, the state control unit performs control to change the second storage unit to the inactive state from the active state.

6. The device according to claim 5, wherein the control unit performs control to keep the first storage unit in the active state after performing control to store the information into the first storage unit.

7. The device according to claim 6, wherein
the state control unit performs control to determine that all processes to the information stored in the first storage unit are completed, and to change the first storage unit to the inactive state from the active state when determining that all processes are completed.

8. The device according to claim 1, wherein
the control unit includes a state control unit configured to control a state of each of the first storage unit and the second storage unit, wherein
after performing control to change the first storage unit to an active state from an inactive state, the state control unit performs control to store the information into the first storage unit, and after performing control to store the information into the first storage unit, the state control unit performs control to change the first storage unit to the inactive state from the active state.

9. The device according to claim 1, further comprising a reception unit configured to receive the information, wherein
the control unit includes a state control unit configured to control a state of each of the first storage unit and the second storage unit, and
the state control unit performs control to keep the second storage unit in an active state when the reception unit receives the information at an interval less than a predetermined time, and performs control to change the second storage unit to an inactive state from the active state when the reception unit receives the information at an interval not less than the predetermined time.

10. A computer program product comprising a computer-readable medium containing a program executed by a computer that includes a first storage unit and a second storage unit having power consumption different from that of the first storage unit, the program causing the computer to execute:
determining a priority of information that is to be stored in the first storage unit or the second storage unit; and
storing the information into the first storage unit or into the second storage unit based on the determined priority, wherein
the second storage unit has power consumption in a non-access state lower than the power consumption of the first storage unit in a non-access state, and
the determining performs control to store the information having a predetermined first priority or higher into the first storage unit and performs control to store the information having a lower priority than the first priority into the second storage unit.

* * * * *